US010401136B1

(12) United States Patent
VanTassell et al.

(10) Patent No.: US 10,401,136 B1
(45) Date of Patent: Sep. 3, 2019

(54) RADIO FREQUENCY TRACKING SYSTEM FOR PROJECTILES

(71) Applicant: Raven Holdings, LLC, North Salt Lake, UT (US)

(72) Inventors: Doug VanTassell, Charlotte, NC (US); David Silva, Reserve, NM (US); Jerry Merritt, Farmington, UT (US); Kevin Harcourt, Bountiful, UT (US)

( * ) Notice: Subject to any disclaimer, the term of this patent is extended or adjusted under 35 U.S.C. 154(b) by 0 days.

(21) Appl. No.: 15/703,075

(22) Filed: Sep. 13, 2017

Related U.S. Application Data

(60) Provisional application No. 62/554,193, filed on Sep. 5, 2017, provisional application No. 62/501,935, filed on May 5, 2017.

(51) Int. Cl.

| | |
|---|---|
| ***F42B 12/38*** | (2006.01) |
| ***F42B 6/04*** | (2006.01) |
| *H04B 1/38* | (2015.01) |
| *G01S 19/14* | (2010.01) |

(52) U.S. Cl.
CPC ............ *F42B 12/385* (2013.01); *G01S 19/14* (2013.01); *H04B 1/38* (2013.01)

(58) Field of Classification Search
CPC .. F42B 6/02; F42B 6/04; F42B 12/362; F42B 12/365; F42B 12/385; G01S 19/19
USPC .................................... 473/570, 578; 455/98
See application file for complete search history.

(56) References Cited

U.S. PATENT DOCUMENTS

| | | | | | |
|---|---|---|---|---|---|
| 3,790,948 | A * | 2/1974 | Ratkovich | F42B 6/04 342/386 | |
| 4,421,319 | A * | 12/1983 | Murphy | F42B 12/362 473/353 | |
| 4,675,683 | A * | 6/1987 | Robinson | F42B 6/04 342/386 | |
| 4,704,612 | A * | 11/1987 | Boy | G01S 1/68 342/386 | |
| 4,749,198 | A * | 6/1988 | Brailean | F42B 12/385 340/636.1 | |
| 4,858,935 | A * | 8/1989 | Capson | F42B 12/385 473/570 | |
| 4,885,800 | A * | 12/1989 | Ragle | F42B 12/385 455/98 | |
| 4,940,245 | A * | 7/1990 | Bittle, Jr. | A01M 31/00 342/386 | |
| 4,976,442 | A * | 12/1990 | Treadway | F42B 12/385 473/570 | |
| 5,024,447 | A * | 6/1991 | Jude | F42B 12/385 342/386 | |

(Continued)

*Primary Examiner* — Alexander R Niconovich
(74) *Attorney, Agent, or Firm* — Additon, Higgins & Pendleton, P.A.

(57) ABSTRACT

A tracking apparatus for use in tracking an arrow, crossbow bolt, or other suitable projectile, includes an electronics unit configured to be connected to a shaft of the projectile. The electronics unit includes a radio frequency ("RF") module. The RF module is electrically associated with a head of the projectile to cause the head to function as a first RF radiating element. The RF module is electrically associated with the shaft to cause the shaft to function as a second RF radiating element. One of the first RF radiating element and the second RF radiating element can be a poise, and the other of the first RF radiating element and the second RF radiating element can be a counterpoise.

36 Claims, 18 Drawing Sheets

(56) References Cited

U.S. PATENT DOCUMENTS

| | | | | | |
|---|---|---|---|---|---|
| 5,157,405 | A * | 10/1992 | Wycoff | F42B 12/385 | 342/386 |
| 5,167,417 | A * | 12/1992 | Stacey | F42B 6/04 | 473/570 |
| 5,188,373 | A * | 2/1993 | Ferguson | F42B 12/385 | 473/578 |
| 5,446,467 | A * | 8/1995 | Willett | F42B 6/04 | 342/386 |
| 5,450,614 | A * | 9/1995 | Rodriguez | F42B 6/02 | 455/128 |
| 6,409,617 | B1 * | 6/2002 | Armold | F42B 12/385 | 455/98 |
| 6,612,947 | B2 | 9/2003 | Porter | | |
| 6,856,250 | B2 | 2/2005 | Hilliard | | |
| 7,232,389 | B2 * | 6/2007 | Monteleone | F42B 12/40 | 473/578 |
| 7,300,367 | B1 * | 11/2007 | Andol | F42B 6/04 | 342/385 |
| 7,331,887 | B1 * | 2/2008 | Dunn | F42B 12/385 | 455/98 |
| 7,632,199 | B2 | 12/2009 | Kikos | | |
| 8,075,430 | B1 * | 12/2011 | Hester | F42B 12/385 | 473/578 |
| 8,088,028 | B2 | 1/2012 | Jones | | |
| 8,192,309 | B1 * | 6/2012 | Roberts | F42B 12/385 | 473/578 |
| 8,393,982 | B2 | 3/2013 | Ferguson | | |
| 8,425,354 | B2 | 4/2013 | Ferguson | | |
| 8,795,109 | B2 | 8/2014 | Roman | | |
| 8,952,808 | B2 | 2/2015 | Steinman et al. | | |
| 8,974,326 | B2 | 3/2015 | Ferguson | | |
| 9,030,296 | B2 | 5/2015 | Steinman et al. | | |
| 9,062,947 | B1 * | 6/2015 | Patel | F42B 6/04 | |
| 9,075,124 | B2 | 7/2015 | Zusman et al. | | |
| 9,307,300 | B2 | 4/2016 | DiSanto | | |
| 9,417,041 | B2 | 8/2016 | Ferguson | | |
| 9,417,042 | B2 | 8/2016 | Klaes et al. | | |
| 9,423,504 | B1 * | 8/2016 | Gossett | G01S 19/19 | |
| 2002/0091023 | A1 * | 7/2002 | Porter | F42B 12/385 | 473/578 |
| 2003/0132846 | A1 * | 7/2003 | Hilliard | A01K 11/008 | 340/573.2 |
| 2005/0231362 | A1 * | 10/2005 | Pridmore, Jr. | A01M 31/002 | 340/539.32 |
| 2007/0105668 | A1 * | 5/2007 | Kikos | F42B 12/385 | 473/578 |
| 2010/0035709 | A1 * | 2/2010 | Russell | F42B 12/385 | 473/570 |
| 2011/0201464 | A1 * | 8/2011 | Ferguson | F42B 12/385 | 473/570 |
| 2011/0250996 | A1 * | 10/2011 | Jones | F42B 12/385 | 473/570 |
| 2011/0306447 | A1 * | 12/2011 | McFatridge | F42B 6/08 | 473/578 |
| 2012/0146770 | A1 * | 6/2012 | Brannen | F42B 6/04 | 340/10.1 |
| 2012/0196708 | A1 * | 8/2012 | Maddox | F42B 6/04 | 473/570 |
| 2012/0220399 | A1 * | 8/2012 | Ferguson | F42B 6/04 | 473/570 |
| 2013/0170900 | A1 * | 7/2013 | Bay | F16B 7/025 | 403/343 |
| 2013/0176110 | A1 | 7/2013 | Steinman et al. | | |
| 2013/0176123 | A1 * | 7/2013 | Steinman | G08C 19/00 | 340/539.13 |
| 2013/0176175 | A1 * | 7/2013 | Zusman | G01S 5/0226 | 342/458 |
| 2014/0100066 | A1 * | 4/2014 | Roman | F42B 6/04 | 473/582 |
| 2014/0266706 | A1 * | 9/2014 | DiSanto | G08C 19/16 | 340/539.13 |
| 2014/0371011 | A1 * | 12/2014 | Kirsch | F42B 12/385 | 473/583 |
| 2016/0000061 | A1 * | 1/2016 | Boyd | A01M 31/002 | 340/539.32 |
| 2016/0091610 | A1 * | 3/2016 | Eggers | G01S 19/19 | 342/357.57 |
| 2016/0282474 | A1 * | 9/2016 | Silvis | G01S 19/52 | |

* cited by examiner

RADIO FREQUENCY TRACKING SYSTEM FOR PROJECTILES

CROSS-REFERENCE TO RELATED APPLICATIONS

This application claims the benefit of both U.S. Provisional Application No. 62/501,935, filed May 5, 2017, and U.S. Provisional Application No. 62/554,193, filed Sep. 5, 2017. U.S. Provisional Application No. 62/554,193, filed Sep. 5, 2017, is incorporated herein by reference, in its entirety.

FIELD OF THE INVENTION

The present invention generally relates to tracking projectiles and, more particularly, to radio frequency tracking of arrows and crossbow bolts.

BACKGROUND

Use of archery equipment to harvest large game is a popular sport. It can be an extremely challenging to get close enough to large game to harvest it with archery equipment. In many situations, a mortally wounded animal impaled by an arrow may travel long distances or through thick cover making recovery difficult, even in situations where the arrow impales a vital organ of the animal.

It is known to associate a radio frequency transmitter with an arrow to aid in locating the arrow and an animal wounded by the arrow. A variety of radio frequency tracking systems for arrows are known. Notwithstanding, there is a desire for such systems that provide a new balance of properties.

SUMMARY

An aspect of this disclosure is the provision of a tracking apparatus configured to be used in tracking a projectile in the form of an arrow or crossbow bolt, or the like. The tracking apparatus can include an electronics unit configured to be connected to a shaft of the projectile. The electronics unit can include a radio frequency ("RF") module configured so that, when the electronics unit is operatively associated with the shaft and a head (e.g., tip or arrowhead) connected to an end of the shaft, the RF module is electrically associated with the head to cause the head to function as a first RF radiating element, and the RF module is electrically associated with the shaft to cause the shaft to function as a second RF radiating element. One of the first RF radiating element and the second RF radiating element can be a poise, and the other of the first RF radiating element and the second RF radiating element can be a counterpoise.

The electronics unit can be configured to be at least partially positioned in the shaft of the projectile. The shaft of the projectile can be constructed of carbon fiber reinforced polymeric material and/or any other suitable material.

The tracking apparatus can include an attachment assembly configured to at least partially attach the head and the electronics unit to the shaft of the projectile. The attachment assembly can include a first conductive member configured to be electrically associated with the head, wherein a first electrically conductive pathway extends from the RF module to the first conductive member. The electronics unit can include a second conductive member configured to be electrically associated with the shaft of the projectile, wherein a second electrically conductive pathway extends from the RF module to the second conductive member. A ground of The RF module can be electrically connected to the head by way of at least the first electrically conductive pathway to cause the head to function as the first RF radiating element (e.g., counterpoise). An amplifier of the RF module can be electrically associated with the shaft by way of at least the second electrically conductive pathway and optionally also capacitive coupling to cause the shaft to function as the second RF radiating element (e.g., poise).

The attachment assembly can include a receptacle configured to releasably receive and retain a shank of the head. In response to receiving the shank, a portion of the attachment assembly can expand to cause the attachment assembly and the electronics unit to be releasably retained in the shaft.

Another aspect of this disclosure is the provision of a method of broadcasting radio frequency ("RF") signals from the projectile. The method can include radiating RF signals from the head and the shaft. Reiterating from above, one of the head and the shaft can function as a poise, and the other of the head and the shaft can function as a counterpoise. The head and/or the shaft can operate as a primary antenna of the projectile.

The method can further include receiving, by a global navigation satellite system ("GNSS") receiver module of the projectile, signals broadcast by GNSS satellites. The method can include deriving, by at least the GNSS receiver module and based upon the received signals, digital data indicative of location of the projectile. The RF tracking signal transmitted by the projectile can include the digital data indicative of location of the projectile.

The foregoing summary provides a few brief examples and is not exhaustive, and the present invention is not limited to the foregoing examples. The foregoing examples, as well as other examples, are further explained in the following detailed description with reference to accompanying drawings.

BRIEF DESCRIPTION OF THE DRAWINGS

The drawings discussed below may be schematic and/or features depicted therein may not be drawn to scale. The drawings are provided as examples. The present invention may, however, be embodied in many different forms and should not be construed as limited to the examples depicted in the drawings.

DETAILED DESCRIPTION

An aspect of this disclosure is the provision of radio frequency tracking systems for projectiles. For example, the projectiles can be arrows of the types propelled by a variety of bows, including crossbows; and the projectiles can be bolts of the types propelled by crossbows. As examples, embodiments of radio frequency tracking systems for projectiles are disclosed in the following. The present invention may, however, be embodied in many different forms and should not be construed as limited to the embodiments set forth herein. For example, features disclosed as part of one embodiment can be used in the context of another embodiment to yield a further embodiment.

Figure 1:
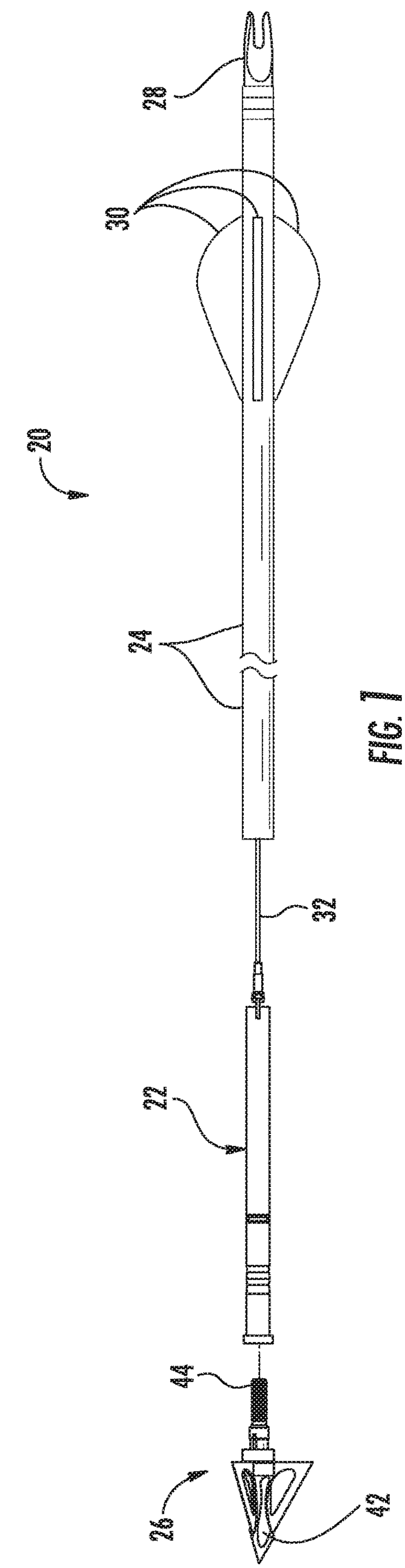
FIG. 1 is a partially exploded side view of a projectile (e.g., arrow) of a first embodiment of this disclosure.

FIG. 1 is an exploded view of a projectile according to a first embodiment of this disclosure. In the example of FIG. 1, the projectile is depicted as being in the form of an arrow 20 that includes an electronics unit 22, shaft 24, tip or head (e.g., arrowhead 26) and nock 28. The electronics unit 22 and arrowhead 26 are shown exploded away from the arrow shaft 24 in FIG. 1. When the arrow 20 of the first embodiment is assembled, the electronics unit 22 is at least partially positioned in an interior space of the arrow shaft 24, and the arrowhead 26 and nock 28 are respectively connected to opposite ends of the arrow shaft. The arrow 20 can further include fletchings 30 (e.g., vanes or feathers) arranged in series around the arrow shaft 24 and connected to the arrow shaft proximate the nock 28. Alternatively, the fletchings 30 can be omitted, in which case the projectile may be referred to as a bolt for a crossbow, or the like.

In accordance with the first embodiment, the electronics unit 22, shaft 24 and tip, head or arrowhead 26 are parts of a primary radio frequency ("RF") antenna system of the arrow 20. The primary antenna system of the first embodiment is configured to operate as part of a tracking system for at least partially determining the present location of the arrow and/or as an instrumentality for radiating other telemetry data remotely, as will be discussed in greater detail below. In an effort to compensate for a potential situation in which the primary antenna system becomes compromised, for example due to the arrow shaft 24 breaking off, the arrow 20 may optionally further include a backup antenna 32. In the example of FIG. 1, the backup antenna 32 is depicted in the form of a whip antenna connected to a rear end of the electronics unit 22 and extending into the interior space of the arrow shaft 24.

The electronics unit 22, arrowhead 26 and backup antenna 32 can be referred to as parts of a secondary RF antenna system of the arrow 20. Similarly to the primary antenna system, the secondary antenna system can operate as part of a tracking system for at least partially determining the present location of the arrow and/or as an instrumentality for radiating other telemetry data remotely. However, as compared to the primary antenna system, the secondary antenna system is typically relatively ineffective unless the arrow shaft 24 breaks off, or the like.

Figure 2:
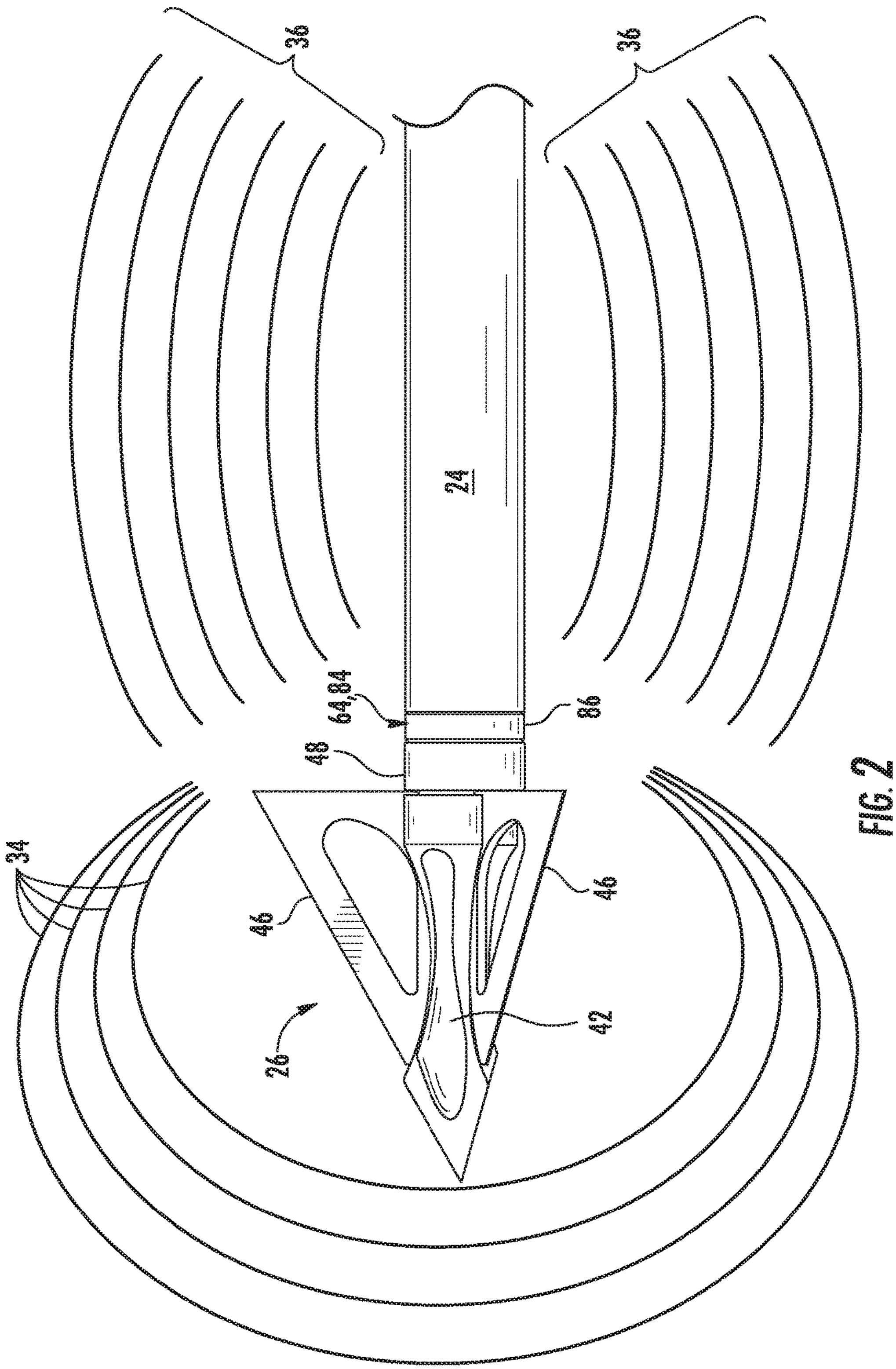
FIG. 2 depicts a front portion of the arrow of FIG. 1 in an assembled configuration, and FIG. 2 further schematically depicts radio frequency ("RF") signals radiating from the arrow, in accordance with the first embodiment.

Referring also to FIG. 2, when the arrow 20 of the first embodiment is fully assembled, the electronics unit 22 is substantially hidden from view in the interior space (e.g., cylindrical chamber or passage) defined by the arrow shaft 24, and the backup antenna 32 is fully concealed within the interior of the arrow shaft 24. In an alternative embodiment, the backup antenna 32 can be partially or fully on the exterior of the arrow shaft 24. When the arrow 20 is fully assembled and operating normally, typically any RF signal from the backup antenna 32 is substantially blocked or attenuated by the arrow shaft 24. For example, in the first embodiment, the arrow shaft 24 is a carbon fiber reinforced polymer shaft (e.g., composite arrow shaft). Such a composite arrow shaft 24 typically acts as a shielded vessel or container, and only allows a small percentage of any RF energy emitted within the composite arrow shaft to pass through and be re-radiated external to the composite arrow shaft.

As another example that will be discussed in greater detail below, operation of the primary antenna system of the arrow 20 can include: (i) the arrowhead 26 functioning as a first radio frequency ("RF") radiating element (e.g., counterpoise), and (ii) the composite arrow shaft 24 functioning as a second RF radiating element (e.g., poise). In FIG. 2, the RF field, or RF waves transmitted by the broadhead arrowhead 26 are schematically depicted by a series of lines 34 that are proximate, and positioned outwardly from, the arrowhead, whereas RF waves transmitted by the composite arrow shaft 24 are schematically depicted by a series of lines 36 that are proximate, and positioned outwardly from, the composite arrow shaft. The two radiating elements, the composite arrow shaft 24 and broadhead 26, together, form an antenna system that effectively radiates RF energy. As will be discussed in greater detail below, the tracking system of the first embodiment further includes at least one RF receiver configured to receive at least some of the RF waves transmitted from the arrow 20.

The arrowhead 26 can be more generally referred to as a head or tip. The arrowhead 26 can be a conventional broadhead that, as a whole, comprises, consists essentially of, or consists of electrically conductive metallic material, for example stainless steel or any other suitable material, so that the arrowhead is suitable for functioning as part of the primary antenna system of the arrow 20. More generally, the arrowhead 26 can be at least partially electrically conductive.

As one of numerous possible examples, and not for the purpose of limiting the scope of this disclosure or the present invention, FIG. 2 depicts that the arrowhead 26 is a broadhead arrowhead that can have a centrally narrowed or centrally tapered shaft 42 forming a sharp tip at its front end, and forming a threaded shank 44 (FIG. 1) at its rear end. The broadhead arrowhead 26 can further include a series of blades 46 arranged in series around the arrowhead shaft 42 and fixedly and/or pivotably connected to the arrowhead shaft, for example so that sharpened outer edges of the blades extend obliquely to the arrowhead shaft. The broadhead arrowhead 26 can further include an annular collar 48 extending around the arrowhead shaft 42 and abutting the radially outwardly extending rear edges of the blades 46. A variety of differently configured electrically conductive arrowheads 26 are within the scope of this disclosure. In the first embodiment, the arrowhead 26 and at least the electronics unit 22 are cooperatively configured so that the arrowhead can function as the first RF radiating element (e.g., counterpoise), as will be discussed in greater detail below.

In the first embodiment, the arrow shaft 24 (FIG. 1) can be a conventional composite arrow shaft that, as a whole, comprises, consists essentially of, or consists of carbon fiber reinforced polymer (e.g., carbon filaments encapsulated in an epoxy resin). Accordingly, as compared to an aluminum arrow shaft, the composite arrow shaft 24 of the first embodiment is a relatively poor (e.g., very poor) conduit for RF radiation, and only allows a small percentage of any RF energy emitted within the composite arrow shaft to pass through and be radiated external to the shaft. Notwithstanding, the carbon filaments of the composite arrow shaft 24 are typically electrically conductive, for example so that the composite arrow shaft is least partially electrically conductive. In this regard, in one aspect of this disclosure, an RF signal is transferred to the composite arrow shaft 24 (e.g., to the carbon filaments of the arrow shaft) so that the composite arrow shaft forms (e.g., the carbon filaments of the arrow shaft form) an active RF radiator. In the first embodiment, the composite arrow shaft 24 and at least the electronics unit 22 are cooperatively configured so that the arrow shaft can function as an RF radiating element (e.g., poise) of the primary antenna system, as will be discussed in greater detail below.

Figure 3:
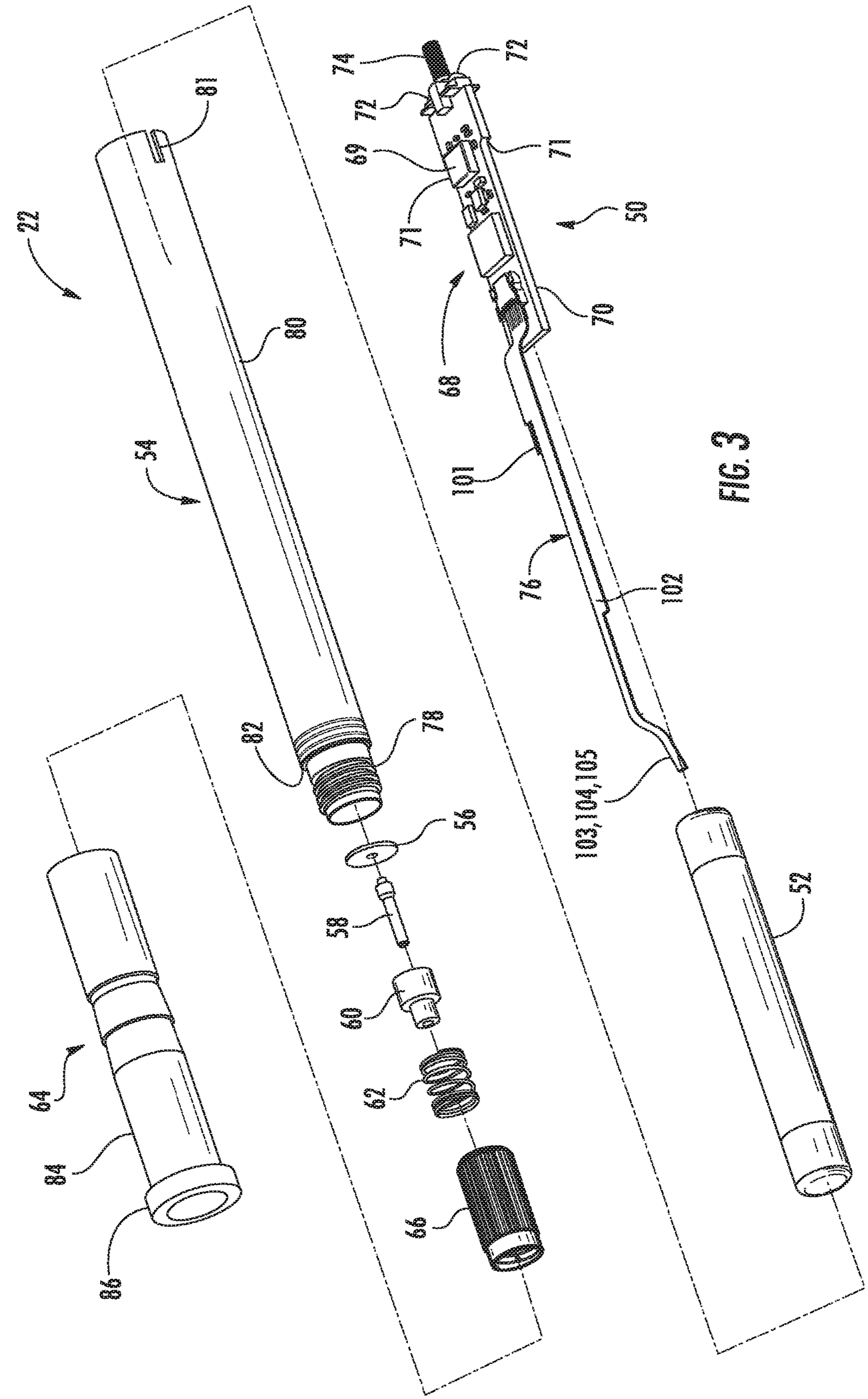
FIG. 3 is an exploded view of an electronics unit of the arrow of FIG. 1.

FIG. 3 is an isolated, exploded view of the electronics unit 22 of the first embodiment. In the first embodiment, the electronics unit 22 includes at least one of each of a circuit board assembly 50, a power supply that can be in the form of a battery 52, a housing 54, a washer-shaped front circuit board 56 (e.g., counterpoise and battery-recharge contact board), pin terminal 58, an annular step-shaped or otherwise tapered insulative collar 60, and a coil spring 62. The electronics unit 22 can further include an attachment assembly and/or the attachment assembly can be considered to be a part that is in addition to the electronics unit. The attachment assembly can include outer and inner attachment members 64, 66 cooperatively configured to at least partially attach the electronics unit 22 and/or the arrowhead 26 to the composite arrow shaft 24, as discussed in greater detail below. The battery 52 can be a primary cell, rechargeable battery, capacitor, super capacitor and/or various combinations of suitable features for providing electrical power.

The circuit board assembly 50 can include numerous electronic components 68 respectively mounted to top and/or bottom surfaces of at least one rear circuit board 70 (e.g., circuit board assembly). In the first embodiment, the electronic components 68 of the circuit board assembly 50 include an RF module, or more specifically an RF transmitter module (e.g., see RF transmitter or transceiver module 180 of FIG. 20). The RF transmitter module typically includes, for example, an RF oscillator, RF amplifier 69, and optionally also an RF modulator. The RF transmitter module of the electronic components 68 is configured to provide an amplified RF signal at the output of the RF amplifier 69. Alternatively, the RF transmitter module can be a transceiver or modem, as discussed in greater detail below with reference to a second embodiment of this disclosure.

A rearward portion of the rear circuit board 70 can be wider than a forward portion of the rear circuit board 70 so that board shoulders 71 are defined at the transition between the wide and narrow portions of the rear circuit board 70. The circuit board assembly 50 can further include, or have associated therewith, one or more light sources 72 and an antenna mount 74. The light sources 72 can be light emitting diodes ("LEDs") or any other suitable features. In the example of FIG. 3, the LEDs 72 and antenna mount 74 are shown connected to a rear end of the rear circuit board 70. The circuit board assembly 50 can further include, or have associated therewith, electrical connectors or wiring. In the example of FIG. 3, the electrical connectors or wiring includes a flexible conductive ribbon cable 76 having a series of insulated wires 101-105 (FIGS. 3 and 10) connected to, and extending forwardly from, respective features (e.g., conductive traces) of the rear circuit board 70. The ribbon cable 76 can be replaced with any other suitable electrical connectors, wiring and/or other suitable features, such as, but not limited to, combining the ribbon cable and circuit board assembly 50 into a rigid-flex circuit board assembly, or the like. Similarly, other features of the electronics unit 22 can be configured differently and/or replaced with other suitable features, or the like.

The housing 54 can be constructed of electrically conductive metallic material and have an externally threaded cylindrical head 78 extending outwardly from a cylindrical body 80 having a larger outer diameter than the head, so that an annular shoulder 82 is defined at the transition between the housing body and the housing head. Considering the housing 54 in isolation, an internal passage can extend therethrough and be open at each of the opposite front and rear ends of the housing. In a rear portion of the housing body 80 of the first embodiment, opposite slots 81 extend through the cylindrical wall of the housing body so that the slots 81 extend to the rear end of the housing body and are internally open to the passageway that extends through housing 54. Whereas some components are described herein as being cylindrical or having other specific shapes, is within the scope of this disclosure for such components to have any other suitable shapes.

The pin terminal 58 and spring 62 can be constructed of electrically conductive metallic material and/or any other suitable material. The insulative collar 60 can be constructed of material that is electrically non-conductive, for example polymeric material and/or any other suitable material. As will be discussed in greater detail below, the front circuit board 56 typically includes a series of respective conductive traces supported by non-conductive substrate material of the front circuit board 56. The front circuit board 56 can be replaced with any other suitable electrical connectors, wiring and/or other suitable features, such as, but not limited to, combining the front circuit board 56, ribbon cable 76 and optionally also the circuit board assembly 50 into a single rigid-flex circuit board assembly, or the like. Accordingly, each of the front circuit board 56, circuit board assembly 50 and rear circuit board 70 can be generally referred to as at least a portion of a circuit board and/or at least a portion of a circuit board assembly.

The outer attachment member 64 can be constructed of material that is electrically non-conductive, for example polymeric material and/or any other suitable material. The outer attachment member 64 can include an outer sleeve 84 having an annular flange 86 extending radially outwardly from a front end of the outer sleeve. The outer sleeve 84 can have an outer surface that is cylindrical, except for optionally including one or more centrally narrowed or centrally tapered frustoconical sections that are shown in FIG. 3. The inner attachment member 66 can be an inner attachment sleeve 66 that is internally threaded, and can have external protrusions that can be in the form of longitudinally extending ribs as shown in FIG. 3. The inner attachment member or sleeve 66 can be constructed of electrically conductive metallic material and/or any other suitable material. The electrically non-conductive outer attachment member 64 can extending at least partially around, or completely around, the electrically conductive inner attachment member or sleeve 66. The inner attachment sleeve 66 can be an electrically conductive member that is configured to be electrically associated with the arrowhead 26 to at least partially define an RF transmission path between the RF module and the arrowhead, as discussed in greater detail below.

Figure 4:
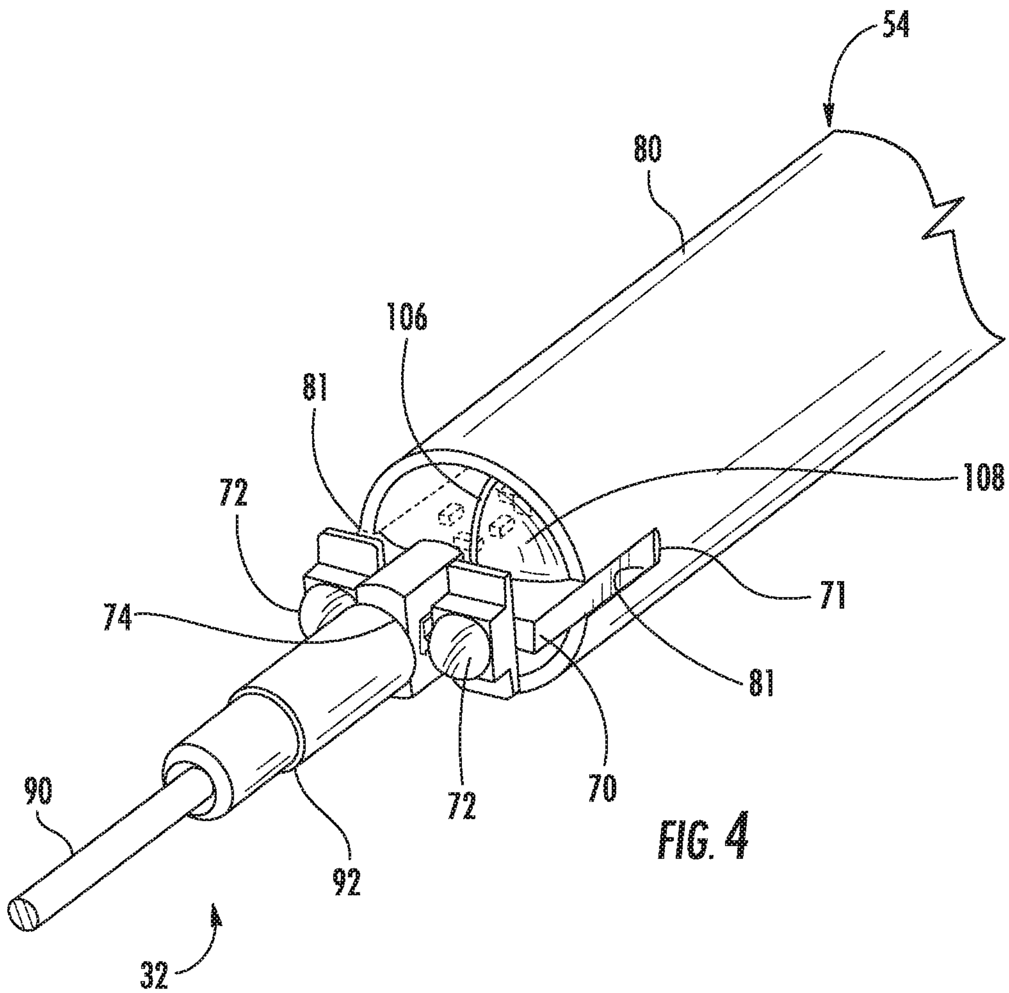
FIG. 4 is a rear view of a portion of the electronics unit of FIG. 3 in its assembled configuration, and FIG. 4 also depicts a portion of a backup antenna connected to the electronics unit, in accordance with the first embodiment.
Figure 5:
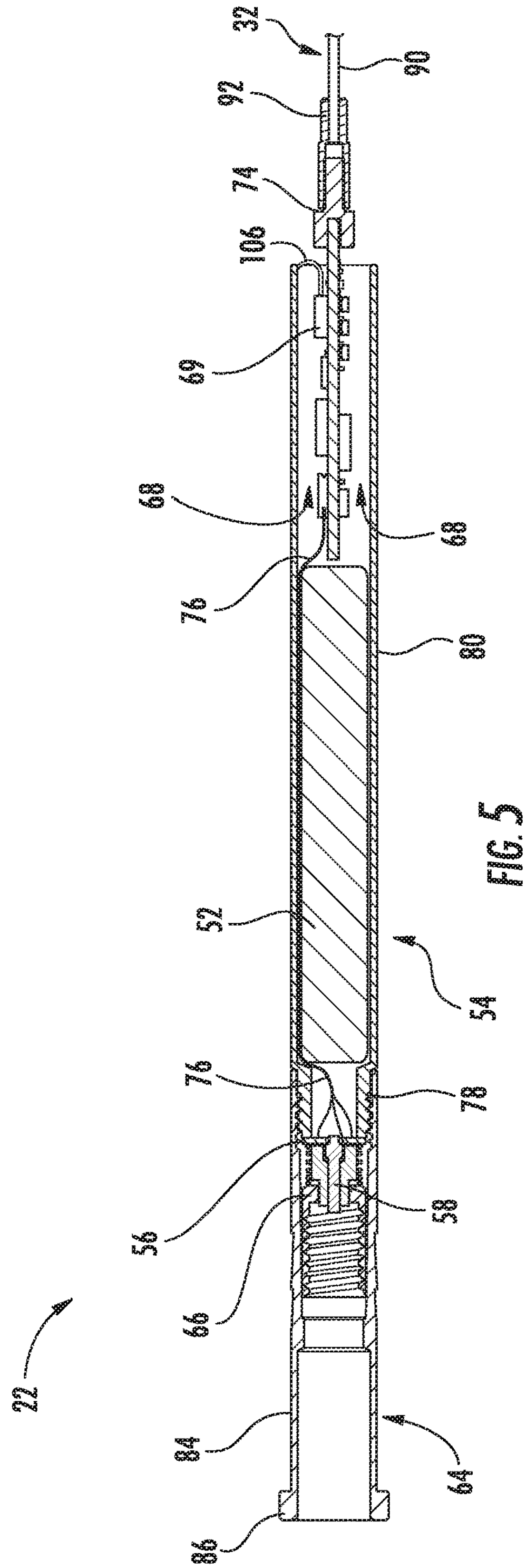
FIG. 5 is a partially cross-sectioned side view of the electronics unit of FIG. 3 together with a portion of the backup antenna.
Figure 6:
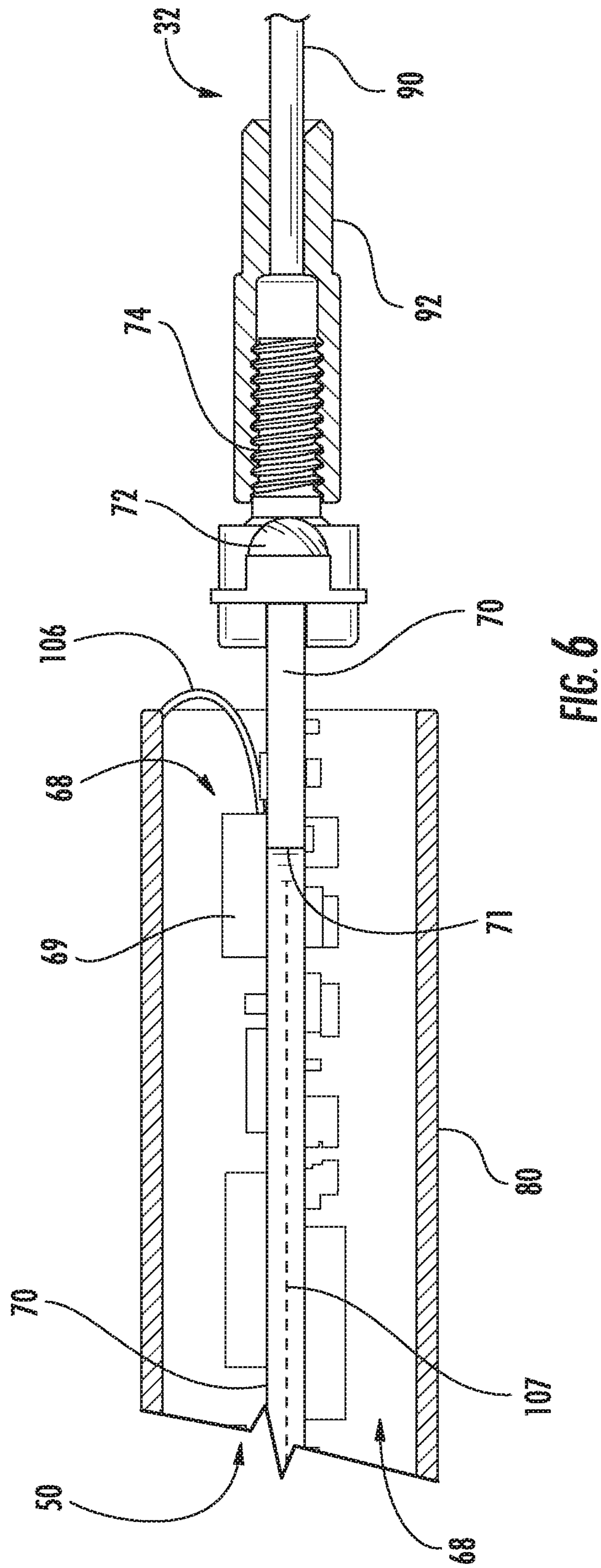
FIG. 6 depicts an enlarged portion of FIG. 5.

FIG. 4 depicts a rear portion of the electronics unit 22 assembled and connected to the backup antenna 32. FIG. 5 is a cross-sectioned side view of the assembled electronics unit 22 connected to the backup antenna 32, and FIG. 6 depicts an enlarged portion of FIG. 5. The backup antenna 32 includes an antenna wire 90 (e.g., a conductive metallic wire optionally having a polymeric, insulating coating) that is mounted in a metallic ferrule 92, so that the metallic core of the antenna wire is at least indirectly in conductive electrical communication with the ferrule. An internally threaded portion of the ferrule 92 can be in threaded engagement with an externally threaded post of the antenna mount 74.

In the first embodiment, output of the RF amplifier 69 is at least indirectly in conductive electrical communication with the antenna wire 90 to provide a secondary conductive RF transmission path for the RF signal ("secondary signal pathway"). The secondary signal pathway can be provided in any suitable manner and may include redundant pathways. In the first embodiment, the secondary signal pathway comprises, consists essentially of, or consists of a serial conductive electrical connection between the output of the RF amplifier 69, optionally at least one conductor of the rear circuit board 70, the antenna mount 74, the antenna ferrule 92, and the backup antenna 32.

For at least partially assembling the electronics unit 22, terminals of the battery 52 can be conductively electrically connected to respective conductors of the rear circuit board 70 in any suitable manner. Referring to FIG. 3 for example, these conductive electrical connections can be at least partially provided by way of ends of first and second wires 101, 102 of the ribbon cable 76 being conductively electrically connected to respective terminals of the battery 52. Additionally and at least partially reiterating from above, other suitable implementations of electrical connection can be employed, such as, but not limited to, individual insulated conductors, a flexible conductive cabling, and/or one or more rigid-flex circuit board assemblies.

The battery 52, circuit board assembly 50 and ribbon cable 76 can be introduced into the interior space of the housing 54 through the rear opening of the housing body 80 by way of relative movement between the housing 54 and the combination of the battery, circuit board assembly and ribbon cable, so that several wires 103-105 (FIG. 10) of the ribbon cable 76 extend within the interior space of the housing past the battery and are proximate the front opening of the housing head 78. The rear circuit board 70 can be mounted in the housing body 80 in any suitable manner. Referring to FIG. 4 for example, opposite marginal portions of the relatively wide rear portion of the rear circuit board 70 can respectively fit into the housing slots 81 so that the board shoulders 71 engage the bases of the housing slots 81. Additionally, the rear opening of the housing body 80 can be obstructed, partially filled and/or closed with one or more drops of non-electrically conductive adhesive material 108 (e.g. epoxy) that fixedly secures the circuit board assembly 50 to the housing body 80.

Figure 10:
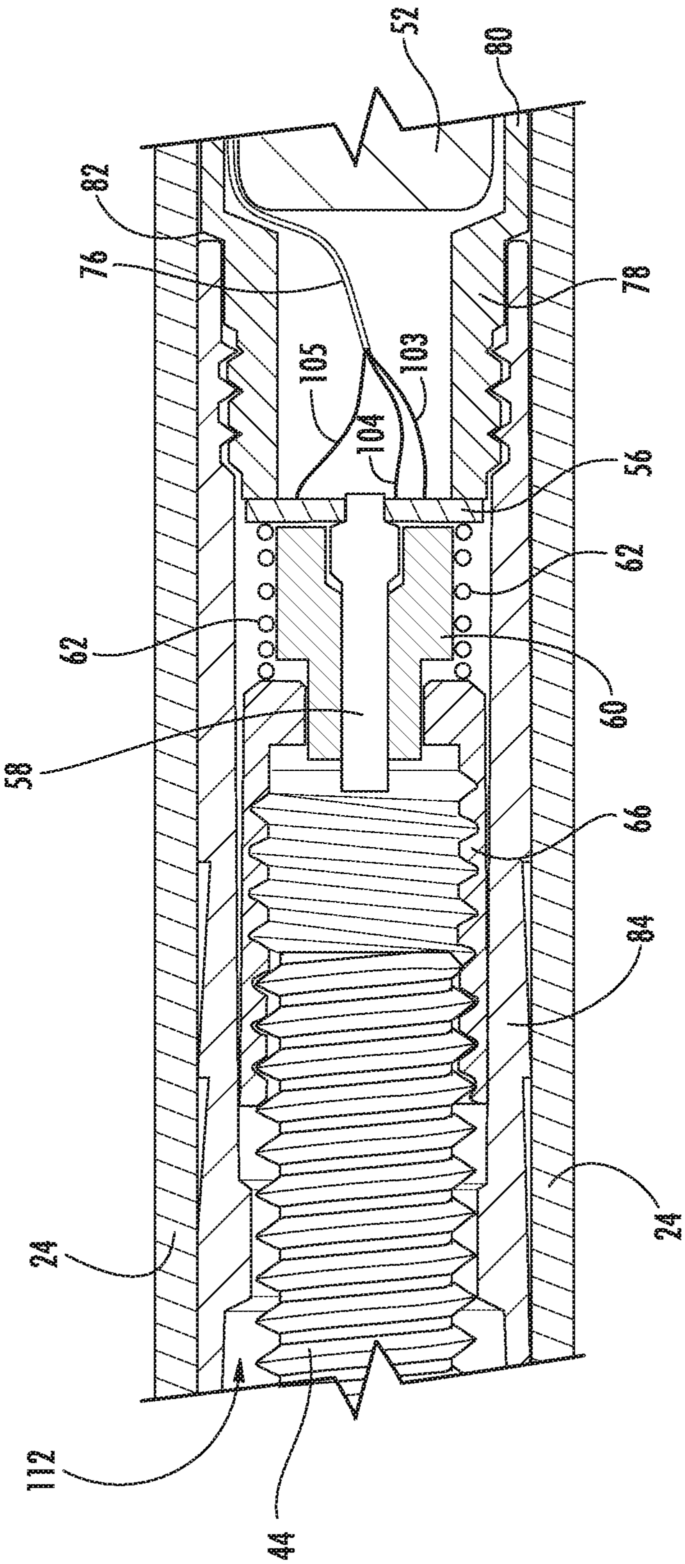
FIG. 10 depicts an enlarged portion of FIG. 9.

Referring to FIG. 10, the ends of the respective wires 103-105 of the ribbon cable 76 can respectively be conductively electrically connected to respective conductive traces of the front circuit board 56. As an example, a pair of the wires 103, 104 and a corresponding pair of the conductive traces of the front circuit board 56 can be parts of conductive electrical paths used in recharging of the battery 52, as will be discussed in greater detail below. Notwithstanding these specific examples, a variety of differently configured recharging-related communication paths are within the scope of this disclosure.

The RF module can be electrically associated with (e.g., in electrical communication with) the tip, head or arrowhead 26 to cause the arrowhead to function as the first RF radiating element. For example, a first electrically conductive pathway can be configured to allow the arrowhead 26 to function as the first radiating element. The first electrically conductive pathway can be at least partially provided by the ribbon cable 76 and/or in any other suitable manner. For example, the wire 105 and a corresponding conductive trace of the front circuit board 56 can serve as a portion of the first electrically conductive pathway that extends from the radio frequency ground ("RF ground") of the RF transmitter module to the arrowhead 26. Referring to FIG. 6 and as a more specific example, the first electrically conductive pathway can extend from an RF ground plane 107 of the rear circuit board 70, wherein the RF ground plane 107 is schematically depicted by a dashed line in FIG. 6. For example, the first electrically conductive pathway can comprise, consist essentially of, or consist of a serial conductive electrical connection between the RF ground of the RF transmitter module (e.g., the RF ground plane 107), the wire 105, the respective conductive trace of the front circuit board 56, the spring 62 and the inner sleeve 66. Notwithstanding these specific examples, a variety of differently configured electrical communication paths are within the scope of this disclosure. For example, the first electrically conductive pathway can be provided in any suitable manner and may include redundant pathways.

An end of the pin terminal 58 can be mated in a central hole of the front circuit board 56 so that the pin terminal is in electrical contact with a respective conductive trace of the front circuit board 56 that is part of one of the conductive electrical paths used in recharging the battery 52. The pin terminal 58 can be encircled by the insulative collar 60, and the insulative collar can be encircled by the spring 62. The inner attachment member 66 can be fixedly mounted (e.g., press-fit in) in the outer sleeve 84 at a position between the opposite ends of the outer sleeve. The housing head 78 can be fixedly mounted in the end of the outer sleeve 84 that is opposite from the flange 86, so that the end of the outer sleeve 84 opposite the flange 86 is engaged against the housing shoulder 82 (FIGS. 3 and 10). The housing head 78 can be fixedly mounted in the rear end of the outer sleeve 84 by way of an interference fit, fasteners and/or adhesive material. For example, the outer surface of the housing head 78 can include indentations or annular grooves for receiving adhesive material and/or the outer sleeve 84 may deform into the indentations or annular grooves. An outer end of the spring 62 can be engaged against the inner end of the inner sleeve 66, and an inner end of the spring can be attached to the respective conductive trace of the front circuit board 56 so that the first electrically conductive pathway includes the spring. In the first embodiment, non-conductive material of the front circuit board 56 can be engaged against and/or connected to the outer end of the housing head 78 so that the housing body 80 is neither in electrical contact with the spring 62 nor in electrical contact with the conductive traces of the front circuit board 56.

The RF module can be electrically associated with (e.g., in electrical communication with and/or capacitively coupled to) the composite arrow shaft 24 to cause the composite arrow shaft to function as the second RF radiating element. For example, the second electrically conductive pathway (e.g., a primary conductive RF transmission path for the RF signals) can be configured to allow the composite arrow shaft 24 to function as the second RF radiating element. In the second electrically conductive pathway of the first embodiment, the output of the RF amplifier 69 is at least indirectly in conductive electrical communication with the housing body 80, so that the housing body is part of the second electrically conductive pathway. The second electrically conductive pathway can be provided in any suitable manner and may include redundant pathways. For example, the second electrically conductive pathway can include the output of the RF amplifier 69 being conductively electrically connected to the housing body 80 by way of at least one conductor, conductive wire 106 (FIGS. 4-7) and/or any other suitable mechanism conductively electrically connected to (e.g., soldered and/or welded to) the housing body 80. As a more specific example, the second electrically conductive pathway can comprise, consist essentially of, or consist of a serial conductive electrical connection between the output of the RF amplifier 69, optionally at least one conductive trace of the rear circuit board 70, the conductive wire 106, and the housing body 80. As alluded to above and discussed in greater detail below, the RF module being electrically associated with the composite arrow shaft 24 can include, for example, capacitive coupling between the composite arrow shaft and the housing body 80 and/or any other suitable implementation (e.g., at least indirect conductive electrical communication).

Figure 7:
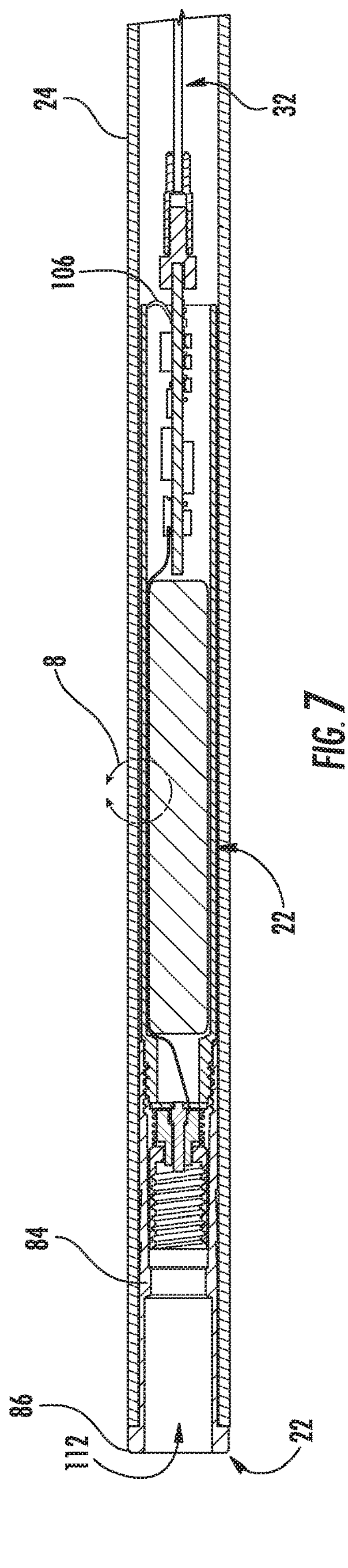
FIG. 7 is a partially cross-sectioned side view of a portion of the arrow of FIG. 1 in a partially assembled configuration.

Referring to FIG. 7, the electronics unit 22 can be inserted into the front opening to the cylindrical interior space of the composite arrow shaft 24 by way of relative movement between the electronics unit and the composite arrow shaft. The relative movement can be arrested by the flange 86 coaxially engaging the annular front end of the composite arrow shaft 24. The outer diameter of the outer sleeve 84 can be only slightly smaller than the inner diameter of the composite arrow shaft 24 so that there is engagement between the outer surface of the outer sleeve 84 and the inner surface of the composite arrow shaft 24, and this engagement can include engagement through one or more annular extents that extend along the length of the outer sleeve and the length of the shaft. In the first embodiment and a second embodiment discussed in greater detail below, the electronics unit 22 is configured to fit within the four millimeter to six millimeter commonly available shafts of arrows and crossbow bolts. Stated differently, the electronics unit 22 can be configured to fit within a composite arrow shaft 24 having an outer diameter of about four millimeters, or within a composite arrow shaft 24 having an outer diameter of about six millimeters. Notwithstanding, a variety of differently configured electronics units 22 are within the scope of this disclosure.

The backup antenna 32 can be configured to be positioned in the composite arrow shaft 24 while the electronics unit 22 is at least partially within the composite arrow shaft. The backup antenna 32 can be configured to extend lengthwise toward a rear end of the composite arrow shaft 24 while the electronics unit 22 is at least partially within a front end section of the composite arrow shaft. The backup antenna 32 may be omitted and/or different configured backup antennas are within the scope of this disclosure.

Figure 8:
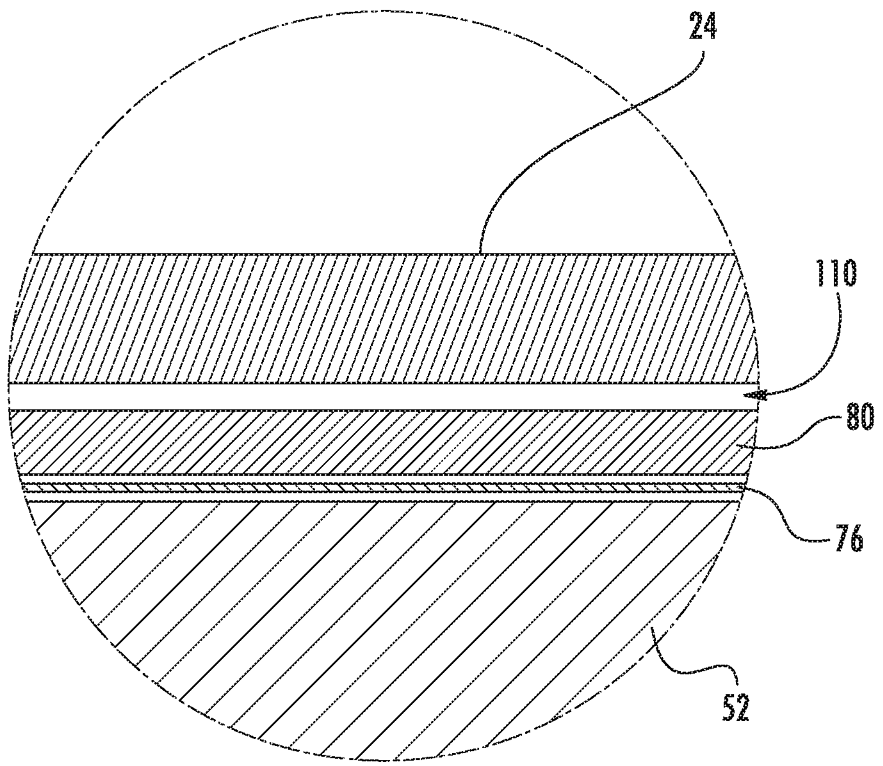
FIG. 8 depicts an enlarged portion of FIG. 7.

Referring also to FIG. 8, which is an enlarged portion of an area of FIG. 7 identified by a double-ended arrow 8 in FIG. 7, an annular gap 110 can be defined between the outer surface of the housing body 80 (e.g., the outer surface of the cylindrical wall defining the housing body) and the inner surface of the composite arrow shaft 24 (e.g., the inner surface of the cylindrical wall defining the composite arrow shaft). The annular gap 110 can extend for the entire length of the housing body 80. In the first embodiment, the gap 110 is filled with dielectric material. For example, the dielectric material can be air and/or any other suitable dielectric material. Typically there is at least one layer of dielectric material between the inner surface of the composite arrow shaft 24 and an outer surface of housing body 80. The gap 110 can be a relatively small gap containing dielectric material in the form of air molecules and/or any other suitable material with dielectric properties. In an alternative embodiment, the dielectric gap 110 may be omitted, so that the exterior surface of the housing body 80 is in direct contact with the interior surface of the composite arrow shaft 24.

When present, the gap 110 can be defined as a result of, for example: the outer surface of the outer sleeve 84 and the outer surface of the housing body 80 being concentrically arranged; the outer diameter of outer sleeve being larger than the outer diameter of the housing body; the inner diameter of the composite arrow shaft 24 being larger than the outer diameter of the housing body; and the composite arrow shaft and the housing 54 being coaxially arranged so that the housing body is supported in cantilever fashion within the interior space defined by the composite arrow shaft. Other configurations are also within the scope of this disclosure. For example, in an alternative embodiment the gap 110 and/or associated dielectric material may be omitted between the housing body 80 and the composite arrow shaft 24, and there can be electrically conductive between the composite arrow shaft 24 and the housing body 80 in the subject region.

The electronics unit 22 can be fixedly or removably mounted in the composite arrow shaft 24. As one example, adhesive material (e.g., epoxy) can be located between the outer surface of the outer sleeve 84 and the inner surface of the composite arrow shaft 24. For example, the outer surface of the outer sleeve 84 can include the above-mentioned annular grooves for receiving the adhesive material. As another example, a press-fit or interference fit can be defined between the outer surface of the outer sleeve 84 and the inner surface of the composite arrow shaft 24, as will be discussed in greater detail below.

Reiterating from above, in the assembled configuration of the arrow 20, the electronics unit 22 can be substantially hidden from view in the interior space defined by the composite arrow shaft 24. In this regard and as one example, the flange 86 may be characterized as being part of the electronics unit 22, and the flange 86 of the electronics unit can be exposed at the front end of the composite arrow shaft. On the other hand, the flange 86 can be referred to as being part of the attachment assembly (which comprises the inner and outer attachment members 64, 66 or sleeves 66, 84) rather than being part of the electronics unit 22. In the latter case, the fully installed electronics unit 22 can be characterized as being fully hidden from view within the arrow 20, for example when the arrowhead 26 is attached to the composite arrow shaft 24 by the attachment assembly.

Figure 9:
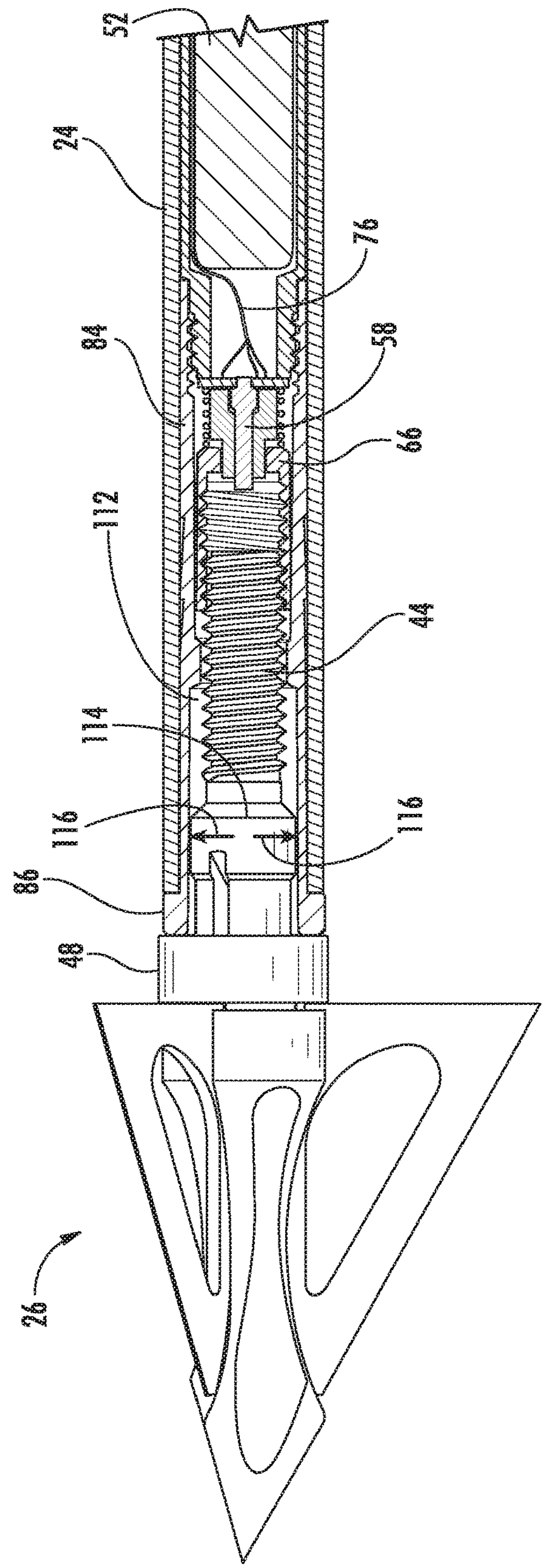
FIG. 9 is a partially cross-sectioned side view of a portion of the arrow of FIG. 1 in an assembled configuration, wherein a shank of a tip, head or arrowhead is engaged in a receptacle of the electronics unit.

Referring to FIG. 7, for attaching the arrowhead 26 to the composite arrow shaft 24, the electronics unit 22, attachment assembly, attachment members 64, 66, and/or sleeves 66, 84 can at least partially define a receptacle 112 configure to receive a portion of the arrowhead, such as the arrow shank 44 (FIGS. 1 and 9). Referring to FIG. 9, the shank 44 or other suitable portion of the arrowhead 26 can be introduced into the forwardly open receptacle 112 by way of relative linear movement between the arrowhead 26 and the composite arrow shaft 24 so that the threaded shank engages the internally threaded inner sleeve 66. Then, with the threads of the shank 44 and inner sleeve 66 engaged to one another, the shank can be drawn farther inwardly into the receptacle 112 and inner sleeve in response to relative rotation between the arrowhead 26 and the composite arrow shaft 24, until the arrowhead collar 48 and flange 86 engage one another to arrest the relative movement.

Reiterating from above, a press-fit or interference fit can be defined between the outer surface of the outer sleeve 84 and the inner surface of the composite arrow shaft 24. As a more specific example, this press-fit or interference fit can be at least partially provided in response to the arrowhead 26 being installed in the receptacle 112. For example and referring to FIG. 9, the outer sleeve 84 can be at least partially formed of an elastic polymeric material and have an annular inner surface with a diameter that is about the same as, or slightly smaller than, an outer diameter of a portion 114 (e.g., an annular or cylindrical portion) of the arrowhead 26. With this configuration, when the shank 44 is forced farther into the receptacle 112 (e.g., drawn farther inwardly into the receptacle 112 in response to engagement and relative movement between the threads of the shank and inner sleeve 66), the arrow shaft portion 114 can be in (e.g., annular) opposing face-to-face contact with and push outwardly against a corresponding portion of the inner surface of the outer sleeve 84 to cause the correspond portion of the outer surface of the outer sleeve to be in (e.g., annular) tight, opposing face-to-face contact with the corresponding portion of the inner surface of the composite arrow shaft 24. The (e.g., annular) tight, opposing face-to-face contact between the outer sleeve 84 and the composite arrow shaft 24 can at least partially define the subject press-fit or interference fit for at least partially mounting the electronics unit 22 in the composite arrow shaft 24. Reiterating and/or stated differently, the electronics unit 22, attachment assembly, attachment members 64, 66, and/or sleeves 66, 84 can at least partially define the receptacle 112 so that it releasably receives (e.g., releasably fixedly retains) the shank 44, and so that, in response to releasably receiving the shank, the attachment assembly and electronics unit are releasably retained in the composite arrow shaft 24 by way of the outer mounting sleeve 84 being forced outwardly against the composite arrow shaft as schematically depicted by arrows 116 in FIG. 9. In this regard, the outer sleeve 84 can be an expandable insert configured so that during the process of screwing the arrowhead shank 44 into the receptacle 112, the expandable insert or outer sleeve 84 expands to lock itself (and, thus, lock the electronics unit 22) into place within the composite arrow shaft 24. Alternatively or additionally, the electronics unit 22 can be mounted in the composite arrow shaft 24 in any other suitable manner. For example, without the interaction of the arrowhead 26, the outer sleeve 84 can be press fit, glued, and/or otherwise secured within the composite arrow shaft 24.

When the arrowhead 26 is fully installed in the receptacle 112, the first electrically conductive pathway of the first embodiment comprises, consists essentially of, or consists of a serial conductive electrical connection between the RF ground of the RF transmitter module (e.g., the RF ground plane 107), the wire 105, the respective conductive trace of the front circuit board 56, the spring 62, the inner sleeve 66 and the arrowhead 26. In the first embodiment, the pin terminal 58 is not part of the first electrically conductive pathway. In this regard and for example, as shown in FIGS. 9 and 10, there can be a gap between the rear end of the arrowhead shank 44 and the front end of the pin terminal 58 when the arrowhead 26 is fully installed in the receptacle 112. In an example of an alternative embodiment, such a gap between the rear end of the arrowhead shank 44 and the front end of the pin terminal 58 does not exist when the arrowhead 26 is fully installed in the receptacle 112, and an appropriately reconfigured first electrically conductive pathway can include the pin terminal 58. Other differently configured first electrically conductive pathways are also within the scope of this disclosure.

Figure 11:
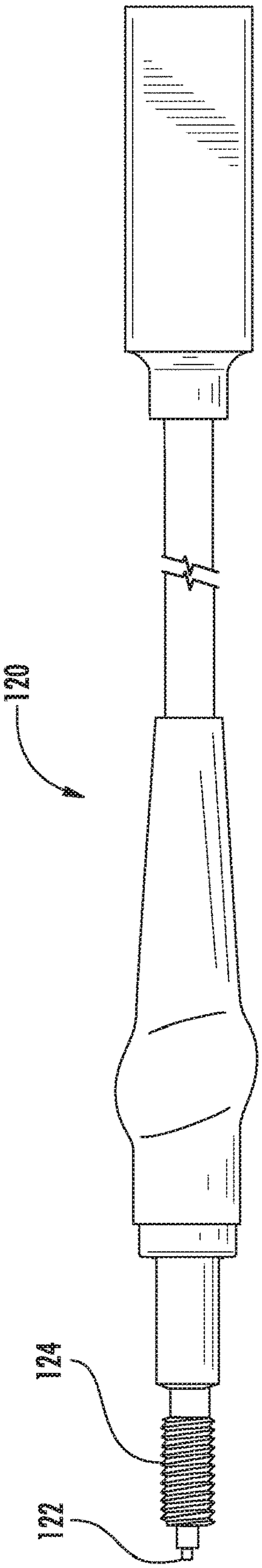
FIG. 11 depicts a charging cable that can be used to recharge a battery of the electronics unit, in accordance with the first embodiment.
Figure 12:
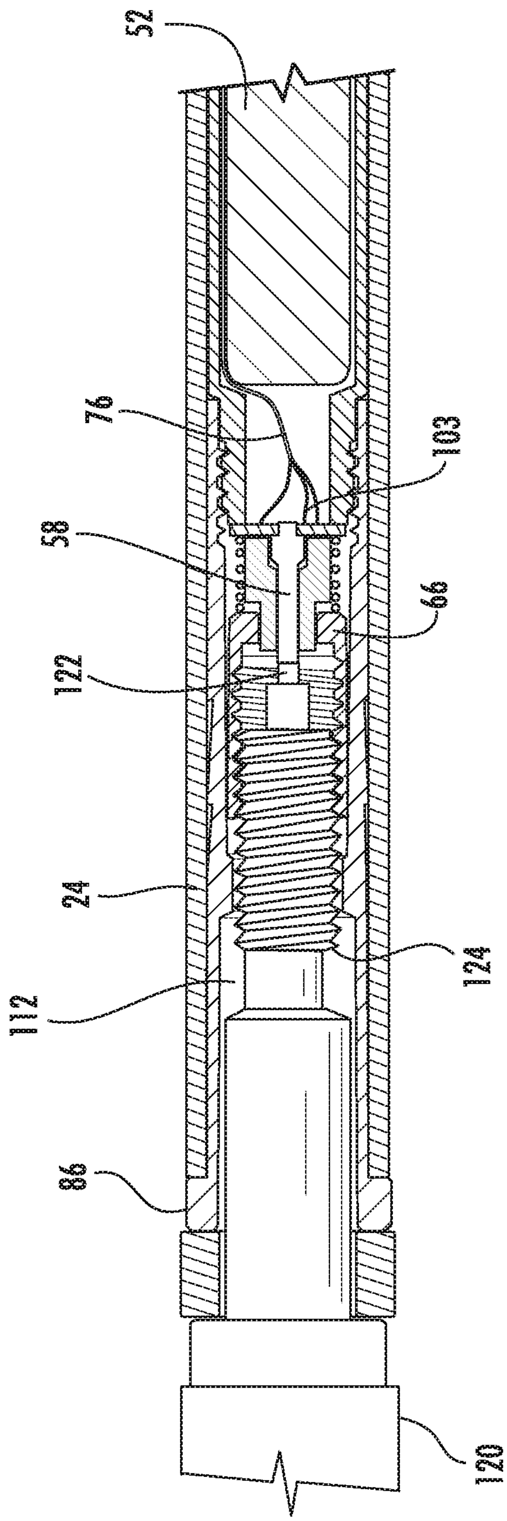
FIG. 12 is a partially cross-sectioned side view depicting a head of the cable of FIG. 11 engaged in the receptacle of the electronics unit, in accordance with the first embodiment.

Referring to FIGS. 11 and 12, when the at least one power supply comprises a rechargeable component such as a rechargeable battery 52, a capacitor, or the like, a male end of a recharging cable 120 can be threaded into the receptacle 112 so that the front end of the electronic unit's or arrow's pin terminal 58 is engaged with the rear end of an electrically conductive pin terminal 122 of the recharging cable, and an electrically conductive outer sleeve 124 of the recharging cable is in threaded engagement with the inner sleeve 66 of the electronics unit 22. For example, with the arrowhead 26 removed from the receptacle 112, the male end of the recharging cable 120 can be threading into the receptacle 112 so that the recharger's outer sleeve 124 comes into conductive electrical communication with the electronic unit's or arrow's inner sleeve 66 of polarity one, and the recharger's pin terminal 122 comes into conductive electrical communication with the electronic unit's or arrow's terminal pin 58 of polarity two. For example, the recharger's pin terminal 122 and outer sleeve 124 are configured to be respective parts of the above-mentioned conductive electrical paths that can be used in recharging the battery 52, or the like. As examples, the charging circuitry for controlling the recharging of the battery 52 can be incorporated into recharging cable 120 and/or the electronics unit 22. For example, the electronic components 68 of the circuit board assembly 50 can include charging circuitry for controlling recharging of the battery 52. Alternatively, the battery 52, or the like, can be recharged in any other suitable manner. For example, the internal rechargeable power source 52 could be recharged using through a non-conductive technique such as inductive charging, wherein the arrow 20 or electronics unit 22 could be placed near an externally located inductive charging unit.

Generally reiterating from above, the pin terminal 58 of the electronics unit 22 can be configured so as: (i) to come into direct contact with the tip of the pin terminal 122 of the recharging cable 120 when the recharging cable is fully installed in the receptacle 112, (ii) but not come into contact with the arrowhead 26 when the arrowhead is fully installed in the receptacle. In an alternative embodiment, the electronic unit's pin terminal 58 can be configured to come into direct contact with the tip of the pin terminal 122 of the recharging cable 120 when the recharging cable is fully installed in the receptacle 112, and also come into direct contact with the arrowhead 26 when the arrowhead is fully installed in the receptacle. In such an alternative embodiment, the first electrically conductive pathway can include the pin terminal 58.

In the first embodiment, the electronic components 68 of the circuit board assembly 50 include electronic components configured to provide different operational states of the electronics unit 22 and, thus, the arrow 20. The operational states can include, for example, an Off State, a Partially On State, and a Fully On State. In the first embodiment, the RF transmitter module of the electronic components 68 is off (i.e., not operating) during both the Off State and the Partially On State, and the RF transmitter module is operating to provide RF signals during the Fully On State, as will be discussed in greater detail below.

For at least partially controlling the transitions between the operational states, the electronics components 68 can include one or more switches, for example at least first and second switches. The first switch and associated features of the electronic components 68 can be configured to transition the electronics unit 22 between the Off State and the Partially On State, and from either the Partially On State or the Fully On State to the Off State. The second switch and associated features of the electronic components can be configured to transition the electronics unit 22 from the Partially On State to the Fully On State. The first and second switches can respectively be a magnetically-operated switch and an accelerometer-based switch, and the electronic components 68 can further include at least one computer processor (e.g., central processing unit 184 of FIG. 20), at least one computer memory (e.g., storage device), and/or any other suitable components configured to facilitate the herein-disclosed operational states, features and methods, or the like. Whereas the electronic components 68 of the first embodiment are part of the circuit board assembly 50, the electronic components can be configured in any other suitable manner and are not required to be part of a circuit board assembly.

Figure 13:
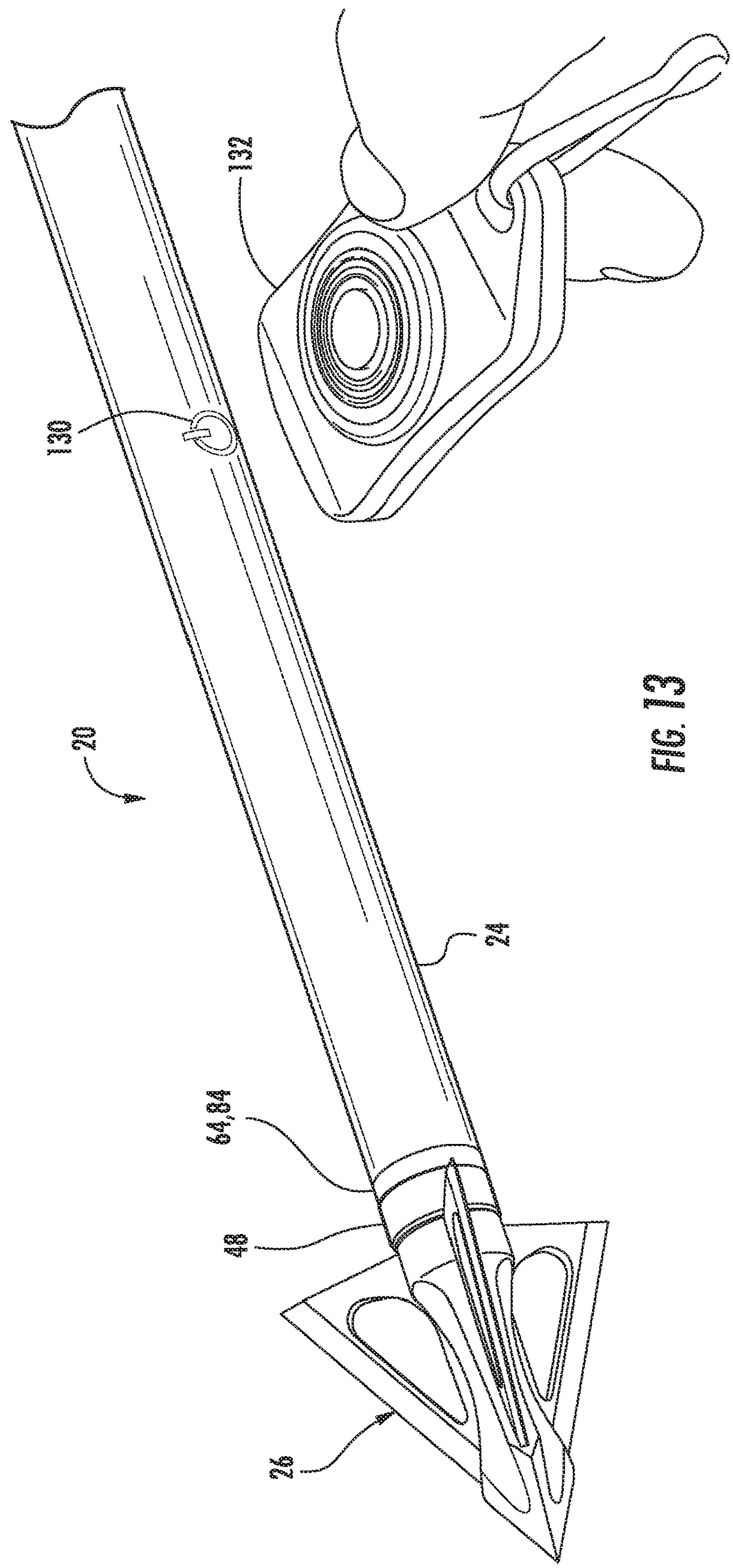
FIG. 13 depicts a user manually moving an magnetic fob proximate indicia on the outer surface of the arrow shaft, for at least partially activating or deactivating the electronics unit, or effecting a change of state of one or more operating modes, in accordance with the first embodiment.
Figure 20:
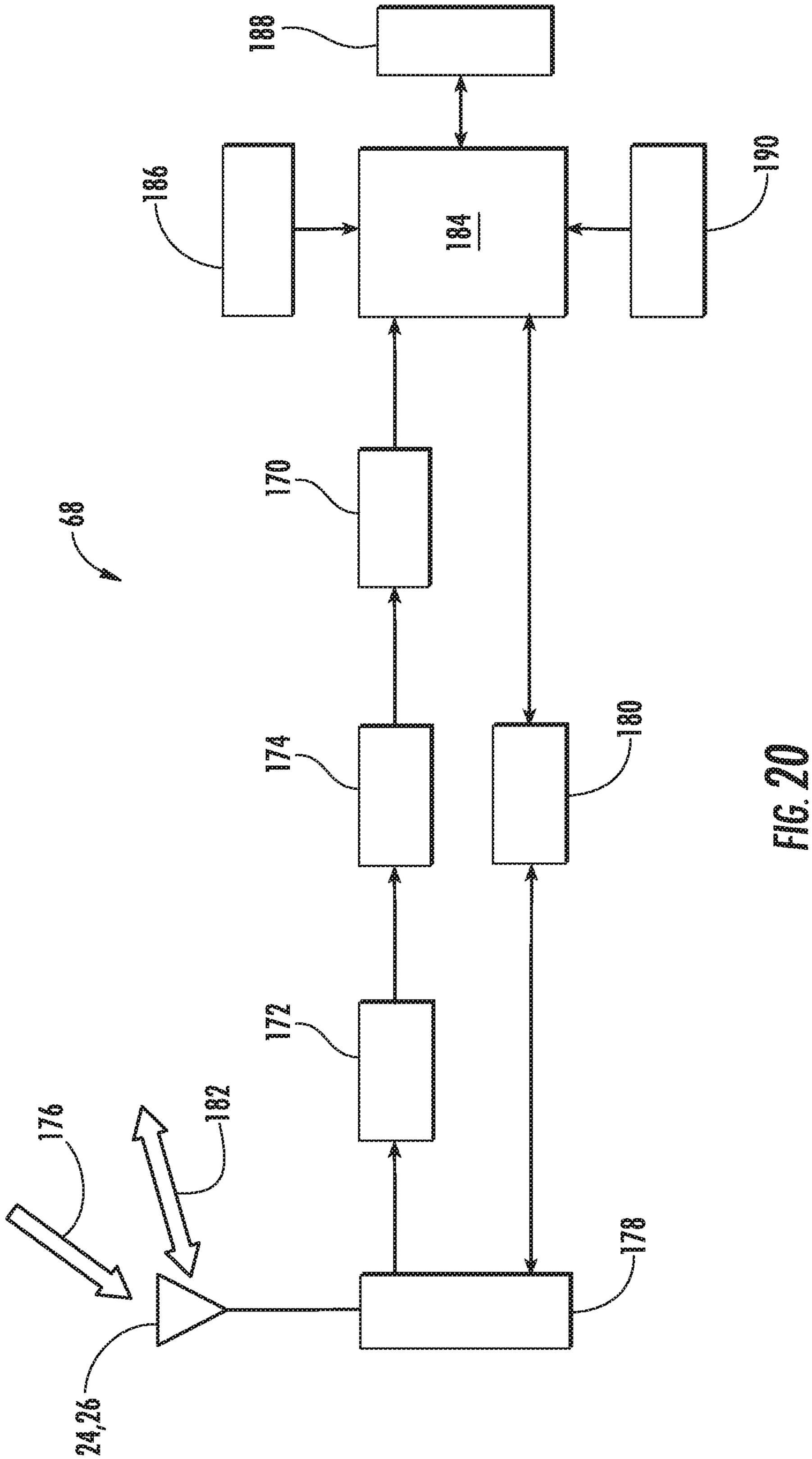
FIG. 20 is a block diagram that schematically depicts selected features of an arrow and its electronics unit, in accordance with the second embodiment.

The magnetically-operated switch can comprise a touchless hall effect sensor (e.g., hall sensor 186 of FIG. 20). Referring to FIG. 13, the outer surface of the composite arrow shaft 24 optionally can include indicia 130 positioned to indicate the approximate position of the magnetically-operated switch of the electronics components 68 within the composite arrow shaft 24. An external magnet (e.g., a fob 132 comprising a magnet) can be moved proximate to the indicia 130/magnetically-operated switch of the electronics components 68 to change the operational state of the magnetically-operated switch and, thus, transition the electronics unit 22 between the Off State and the Partially On State, and from the Fully On State to the Off State. For example, the magnetically-operated switch is configured provide a change of operational state in response to the magnetically-operated switch being exposed to a magnetic field of predetermined magnitude (e.g., by the fob 132). At least partially reiterating, the electronics unit 22 can be armed, partially activated, or the like, through the use of a switch, such as, but not limited to, the touchless hall effect sensor incorporated into the electronic components 68. The hall effect sensor is configured to sense the presence of a momentary magnetic field passed over the exterior of the composite arrow shaft 24. When the external magnetic article 132 is passed over the section of the composite arrow shaft containing the hall sensor of the electronic components 68, the hall sensor detects this event and in response to this detecting the electronic components 68 operate in the Partially On State (e.g., a ready operational state). Then, repeating the process of exposing the hall effect sensor to the predetermined magnetic field would place the electronic components 68 in the Off State (e.g., a sleeping or off operational state). The electronics unit 22 typically draws minimal current from the battery 52 during the Off State, and the electronics unit typically draws less current from the battery 52 during the Partially On State as compared to the Fully On State.

The accelerometer-based switch can be provided by way of at least one accelerometer module (e.g., see the one or more accelerometers 188 of FIG. 20) that is electrically connected to the processor unit. When in the Off State, electrical power is typically not supplied to the accelerometer module. In contrast, in the Partially On State of the first embodiment, electrical power is supplied to the accelerometer module so that the accelerometer-based switch is operative to provide a change of state (e.g., a change from the Partially On State to the Fully On State) in response to the accelerometer of the accelerometer-based switch being exposed to an acceleration of predetermined magnitude.

Figure 14:
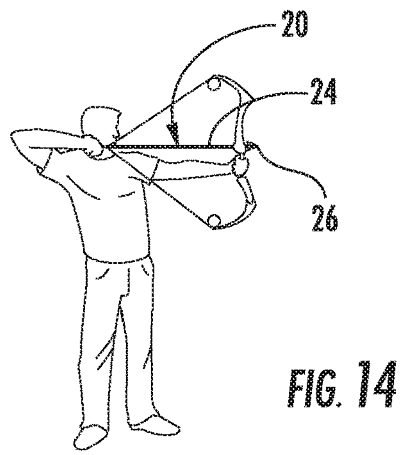
FIG. 14 depicts a user preparing to launch the arrow, wherein the electronics unit is in a ready or armed operational state (e.g., a non-transmitting operational state), in accordance with the first embodiment.
Figure 15:
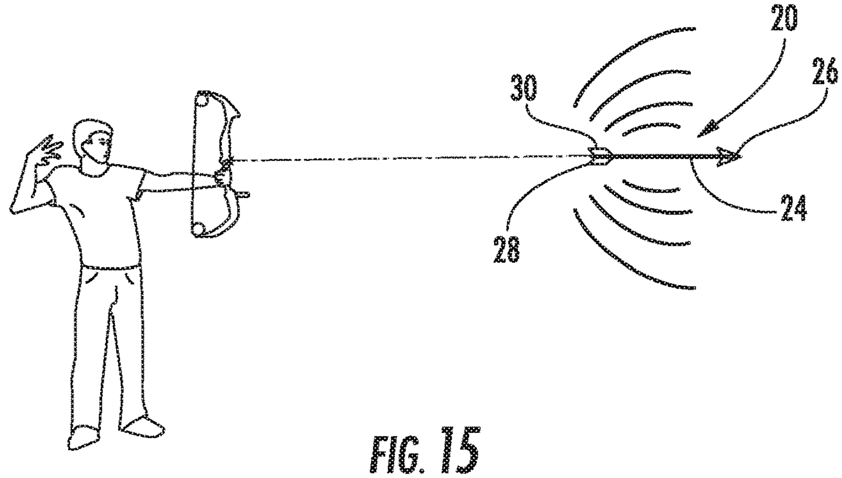
FIG. 15 depicts the arrow shortly after it has been launched, wherein the electronics unit is in an active operational state (e.g., transmitting RF signals), in accordance with the first embodiment.

As an example, a method of using the arrow 20 can include a user using a magnetic fob 132 to cause the electronics unit 22 of the arrow 20 to operate in the Partially On State, the user then nocking the arrow in a bow (e.g., placing the bowstring in the slot of the nock 28) and drawing arrow with the bowstring backward in preparation for shooting the arrow (FIG. 14), and then releasing the bowstring with the arrow to shoot the arrow (FIG. 15). As schematically depicted in FIG. 15 for the first embodiment, such shooting of the arrow 20 from the bow immediately exposes the accelerometer of the accelerometer-based switch to the predetermined magnitude, so that the accelerometer-based switch causes operation of the electronics unit 22 to change from the Partially On State to the Fully On State in response to the arrow being launched from the bow.

At least partially reiterating from above and in accordance with one example, the electronics unit 22 of the arrow 20 can be placed in its Partially On or "armed" operational state by passing the magnetic fob 132 in close proximity to the optional indicia 130/the magnetically-operated switch of the electronic components 68, for example, before the arrow is nocked in the bow (i.e., before the bowstring is placed in the slot of the nock 28). In the Partially On State, the electronics unit 22 (e.g., the accelerometer of the accelerometer-based switch of the electronic components 68) is enabled to sense the rapid acceleration when the arrow 22 is launched by the bow. The accelerometer-based switch of the electronic components 68 can include a relatively high-G accelerometer (e.g., see the one or more accelerometers 188 of FIG. 20) that senses the rapid acceleration of the arrow 20 that occurs when the arrow is launched from the bow, and in response to that sensing the accelerometer provides an electronic signal that is sensed by another of the electronic components 68 to cause the electronics unit 22 to responsively operate in the respective operational state (e.g., the Fully On State).

In the first embodiment, the high-G accelerometer of the electronic components 68 is selected so that the Fully On State is not initiated in response to accelerations less than those typically experienced by arrows being properly shot from bows. For example, the high-G accelerometer can be configured to sense any acceleration of more than about one hundred g-forces (wherein one g-force is equal to the force of gravity at the Earth's surface), so that the electronics unit 22 begins to operate in the Fully On State in response to the electronics unit being exposed an acceleration of more than about one hundred g-forces ("g's"). That is, the electronics unit 22 may switch from the Partially On State to the Fully On State in response to sensing acceleration of more than about one hundred g's. Notwithstanding, the present disclosure is not limited to a requirement of one hundred g's. For example, in alternative embodiments the electronics unit 22 can be switched to the Fully On State in any other suitable manner. Notwithstanding, it may be useful for the electronics unit 22 to switch from the Partially On State to the Fully On State using a High-G accelerometer capable of discerning acceleration greater than about one hundred g's, rather than using a Low-G accelerometer limited to sensing from about ten to fifty g's, in an effort to avoid false activations of the accelerometer switch and premature changes from the Partially On State to the Fully On State.

Referring back to FIG. 2 and as discussed above for the first embodiment, when the arrow 20 is fully assembled and in the Fully On State, the arrow 20 forms an antenna system resembling a di-pole antenna, wherein operation of the primary antenna system of the arrow comprises: (i) the arrowhead 26 functioning as a first radio frequency ("RF") radiating element (e.g., counterpoise), and (ii) the composite arrow shaft 24 functioning as a second radio frequency radiating element (e.g., poise). In this regard, the assembled arrow 20 operating in the Fully On State can function as a type of dipole antenna system using a combination of the arrowhead 26 as a radiating element of the primary antenna system, namely the "counterpoise", and the composite arrow shaft 24 itself as the second radiating element of the primary antenna system, namely the "poise." The effective feed point of the primary antenna system of the first embodiment is located at the face-to-face contact between the flange 86 of the outer attachment member or sleeve 64, 84 and the collar 48 of the arrowhead 26.

In accordance with the first embodiment, the primary antenna system of the first embodiment has two parts, the poise, or active radiating element, and the counterpoise, also known as ground plane or passive radiating element. Together the poise and counterpoise may form a dipole antenna. In the first embodiment, the poise comprises, consists essentially of, or consists of the composite arrow shaft 24 and the electronics unit housing 80, whereas the counterpoise comprises, consists essentially of, or consists of arrowhead 26. In the first embodiment, the term counterpoise may be used interchangeably with the term RF ground (e.g., Radio Frequency ground). One side of the primary antenna system (poise) is fed from the output terminal of the RF amplifier circuit 69, while the counterpoise acts as an RF ground, or RF ground plane, giving the RF field generated from the active radiating element, in this case the composite arrow shaft 24 (poise), a plane by which to have the field lines 34 (FIG. 2) join their inverse counterpart field lines 36 (FIG. 2) from the counterpoise to form a complete antenna system. These two radiating elements operate together to form the primary dipole antenna system of the first embodiment.

For enabling the primary antenna system to function in free space (e.g., above the earth's surface) and radiate with efficiency (away from any earth ground), the primary dipole antenna system of the first embodiment contains both the poise and counterpoise. Referring back to FIG. 2, the primary dipole antenna system of the first embodiment is formed between the poise comprised of the composite arrow shaft 24, and the counterpoise comprised of the conductive arrowhead 26, wherein the shoulder of the flange 86 of the non-conductive sleeve 84 forms the effective feed point of the primary dipole antenna system. In the first embodiment, the output of the RF Amplifier 69 is electrically in connection with the housing body 80. As part of the RF module being in electrically associated with the composite arrow shaft 24, the housing 54, or at least a portion thereof, can be an electrically conductive member that is configured to be electrically associated with the composite arrow shaft. For example, the RF field present on the housing body 80 can be capacitively coupled through the annular gap 110 and the dielectric material contained in that gap to the composite arrow shaft 24, so that the composite arrow shaft functions as the primary radiating element or poise of the primary antenna system of the first embodiment.

In the first embodiment, the RF amplifier 69 (FIG. 3) is connected by way of a solder connection to the rear circuit board 70, along a conductive trace on the rear circuit board, then through a solder connection on the board shoulders 71 (and/or the wire 106) to the conductive transmitter housing body 80. Therefore, the transmitter housing body 80 of the first embodiment forms part of the poise. In the first embodiment, the transmitter housing body 80 is capacitively coupled by way of close annular proximity to the composite arrow shaft 24 through the dielectric medium in the gap 110 (FIG. 8) to the primary radiating element which is comprised of the composite arrow shaft 24.

Reiterating from above, in the first embodiment the electrically conductive transmitter housing body 80 of the electronics unit 22 is at least indirectly conductively electrically connected to the output of the RF amplifier 69, for example by way of at least the conductive wire 106 and/or by way of any other suitable electrically conductive medium, such as solder connection(s). Accordingly, in the first embodiment, the electronics unit housing 80 is configured to function as an antenna terminal and output, and the electronics unit housing 80 communicates the RF signal from the RF transmitter module of the electronic components 68 to the composite arrow shaft 24 through the process of capacitive coupling. In this regard, the electric field present on the electronics unit housing 80, which is located inside the composite arrow shaft 24, is effectively transferred across the annular, elongate gap 110 (FIG. 8) to the composite arrow shaft 42.

The arrow system 20 of the first embodiment is configured so that significant surface area of the housing body 80 of the electronics unit 22, and the close proximity of the housing body 80 to the interior surface of the composite arrow shaft 24, are cooperative to allow the RF signal to transfer from the housing body 80 to the composite arrow shaft 24 itself, for example by way of capacitive coupling.

As a result, the composite arrow shaft 24 can function as an RF radiating element. In the first embodiment, the capacitive coupling mechanism for transferring the RF signal from the housing body 80 of the electronics unit 22 to the composite arrow shaft 24 is configure to provide for efficient transfer of the RF signals of electronics unit 22 onto the composite arrow shaft 24 itself, thus transforming the composite arrow shaft from an RF insulator to an active radiating element of the primary antenna system of the arrow 20. The composite arrow shaft 24 may be referred to as an RF insulator, or more generally as substantially an RF insulator, because, for example, of its content of non-electrically conductive polymeric material. Notwithstanding, the composite arrow shaft 24 of the first embodiment can be at least partially electrically conductive, for example when including carbon filaments, as discussed above.

An aspect of the first embodiment is the provision of the capacitive coupling between at least a portion of the housing 54 of the electronics unit 22 and at least a portion of the composite arrow shaft 24. The capacitive coupling can comprise RF energy (e.g., RF signals) being transferred from the conductive skin of the housing body 80 of the electronics unit 22 to the composite arrow shaft 24. In the first embodiment, RF radiation can be transferred from within the composite arrow shaft 24, and it can be re-radiated from the exterior of the composite arrow shaft, so that the composite arrow shaft functions as the main radiating element of the primary antenna system.

In the first embodiment, the arrowhead 26 functions in both the primary and secondary antenna systems as the second radiating element or counterpoise. At least partially reiterating from above, the arrowhead 26 can be electrically associated with (e.g., in electrical communication with) the RF ground plane 107 (FIG. 6) of the circuit board assembly 50. In the first embodiment, the electrical communication from the RF ground plane 107 to the arrowhead 26 is made by way of electrical conduction comprising the RF ground plane 107 being in electrical communication with a respective wire of the ribbon cable 76, the respective wire being in electrical communication with the front circuit board 56, the front circuit board being in electrical communication with the conductive spring 63, the conductive spring being in electrical communication with the conductive inner bushing 66, and the inner bushing being in electrical communication with arrowhead 26 when the arrowhead is installed into the electronics unit 22. This conductive connection from RF ground of the transmitter module (e.g., from the ground plane 107) to arrowhead 26 can be made in multiple different suitable ways other than those described above.

In another embodiment, the poise and counterpoise can be interchanged as compared to the arrangement described above, so that the arrowhead 26 functions as the poise, and the composite arrow shaft 24 functions as the counterpoise. For example, the output from the RF module (e.g., the RF amplifier) can be electrically connected to the arrowhead 26, and the RF ground of the transmitter module (e.g., the ground plane 107) can be connected through either conductive or capacitive implementations to the composite arrow shaft 26. Accordingly and as a general example, one of the composite arrow shaft 24 and the arrowhead 26 can function as the poise, and the other of the composite arrow shaft and the arrowhead can function as the counterpoise. At least partially reiterating from above, the arrowhead 26 can more generally be referred to as, or be in the form of, a tip or head.

In the first embodiment, there is not any direct conductive electrical connection between the RF transmitter module of the electronic components 68 and the composite arrow shaft 24, for example due to the dielectric-filled gap 110 (FIG. 8) and the non-electrically conductive outer attachment member 64 (e.g., the outer sleeve 84 and flange 86). In contrast and in accordance with an alternative embodiment, there can be direct conductive electrical connection between the composite arrow shaft 24 and the RF transmitter module of the electronic components 68. In an example of such an alternative embodiment, the housing 54 of the electronics unit 22 may be in direct or indirect physical contact with the composite arrow shaft 24 providing direct electrical conduction between the RF Amplifier 69 and the shaft 24. For example, it is believed that at least one non-insulated conductive wire may be bonded to the interior of composite arrow shaft 24, and there can be a direct conductive electrical connection between such non-insulated conductive wire(s) and the output of the RF amplifier 69, or the like.

Regarding the alternative embodiment in which there may be direct conductive electrical connection between the RF transmitter module of the electronic components 68 and the composite arrow shaft 24, it is believed that one or more carbon fibers may optionally be exposed at the interior surface of the composite arrow shaft 24 so that the subject non-insulated conductive wire(s) may be in direct electrical contact with the one or more carbon fibers exposed at the interior surface of the composite arrow shaft. As an alternative example, the composite arrow shaft 24 may comprise, consist essentially of, or consist of a conductive metallic material, such as aluminum, and the subject non-insulated conductive wire(s) may be in direct electrical contact with the conductive metallic material of the composite arrow shaft. A variety of differently configured arrow shafts 24 are within the scope of this disclosure.

Figure 16:
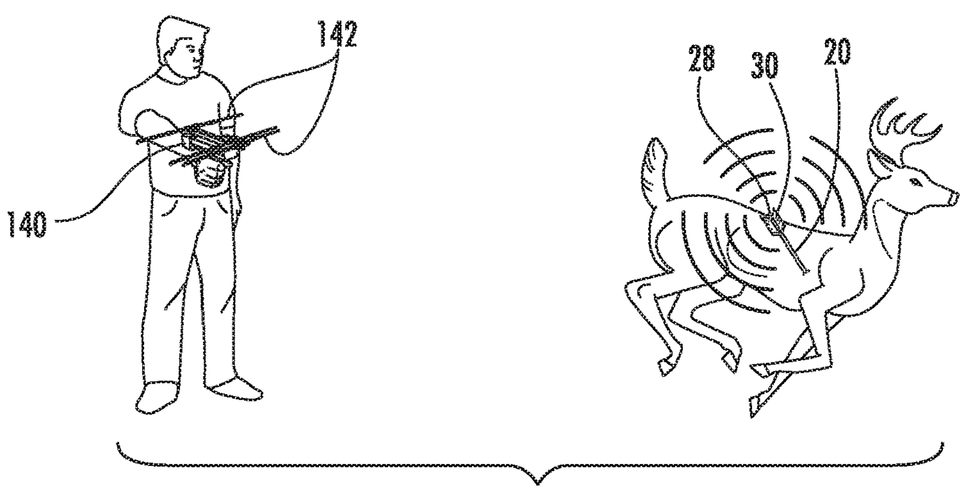
FIG. 16 depicts the arrow impaled in an animal and transmitting RF signals, and the user using a tracking receiver, in accordance with the first embodiment.

Referring to FIG. 16, when the electronics unit 22 of the arrow 20 is within the intact arrow shaft 24 and operating in the Fully On State, the arrow can be tracked using a conventional RF receiver 140 having a conventional directional antenna 142 that receives at least the RF waves 36 transmitted by the arrow. Alternatively and for example, in any situations in which the composite arrow shaft 24 breaks away from the electronics unit 22 and the electronics unit 22 is operating in the Fully On State, at least the electronics unit 22 can be tracked by way of the RF receiver 140 receiving at least the RF waves transmitted by the backup antenna 32 (FIGS. 1, 6 and 7). In the first embodiment, the backup antenna 32 does not function as the primary RF signal radiator under normal conditions; the backup antenna 32 is configured to function as meaningful RF signal radiator typically only in the event that the composite arrow shaft 24 is severed or removed, exposing the backup antenna 32 to the ambient environment. For example, the backup antenna 32 of the first embodiment is configured so that it becomes an effective RF radiator if the composite arrow shaft 24 becomes significantly shortened, is damaged, or is removed after the arrow 20 has struck an object such as an animal that is the target of the arrow.

In the first embodiment, the above-discussed RF waves transmitted by the respective features of the arrow 20 are continuous wave ("CW") signals. Typically the RF signals from the electronics unit 22 are pulsed on and off to reduce the amount of electrical power drawn from the battery 52.

FIG. 16 schematically depicts a user using the direction-finding RF receiver 140 receiver to locate an animal that has been wounded by the arrow 20. The receiver 140 can receive the RF signals transmitted by the arrow 20 (e.g., transmitted by the respective features of the arrow) and produce and audible tone or "beep" by which the user locates the impaled animal by searching for the strongest beep. Suitable receivers 140 (e.g., tracking receivers) are available from, for example, Marshall Radio Telemetry of North Salt Lake, Utah.

Figure 17:
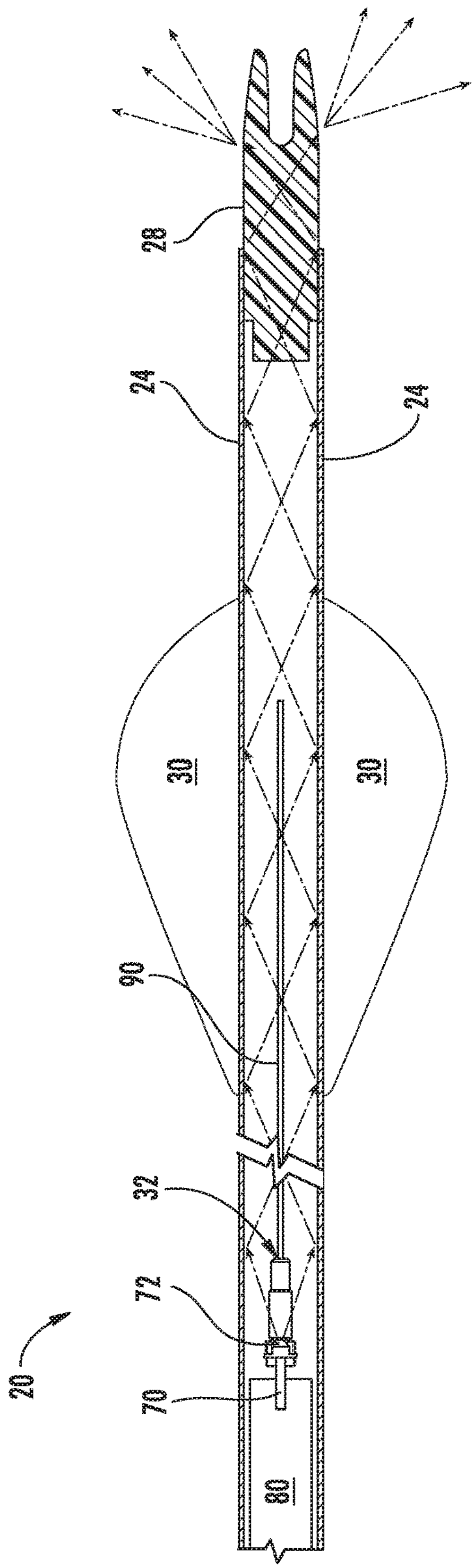
FIG. 17 is a partially cross-sectioned side view of a portion of the arrow in an active operational state, wherein light is schematically depicted as being transmitted to, and emitted from, the nock, in accordance with the first embodiment.

Referring to FIG. 17, at least a portion of the nock 28, or the nock as a whole, can be transparent, for example clear and/or translucent. The electronics unit 22 can be configured to operate the one or more light emitting devices, for example the LED(s) 72, to indicate the current operational state of the electronics unit 22 to the user by way of light transmitted from the LED(s) emanating outwardly from the nock 28, as schematically shown in FIG. 17. The light from the LED(s) 72 can travel from the LED(s) rearwardly down the internal, cylindrical pathway that extends through the interior of the composite arrow shaft 24, for example so that the air or any other suitable light-transmitting medium in the pathway functions as part of an optical waveguide.

For example, the electronics unit 22 can operate the LED(s) 72 to project one or more colors of light down the elongate internal path of the composite arrow shaft 24 so that light passes out through the nock 28. The electronics unit 22 can be configured to communicate the operational state of the electronics unit 22 by way of the LED(s) 72 and nock 28 providing contrast between colors of the light that is emitted through the nock, contrasts between patterns of flashes of the light that are emitted through the nock, the presence or lack of light being emitted through the nock and/or any other suitable light-based communication schemes. In addition to indicating the operational status of the electronics unit 22, the light emitted through the nock 28 from the LED(s) 72 can serve as an visual indicator of the trajectory of the arrow 20 or to assist the user in recovery of the arrow in the event of the arrow missing or passing through the target. At least partially reiterating from above, the electronic components 68 of the electronics unit 22 can include at least one computer processor (e.g., processor unit), at least one computer memory (e.g., storage device), and/or any other suitable components configured to control operation of the LED(s) 72 and/or other components.

Figure 18:
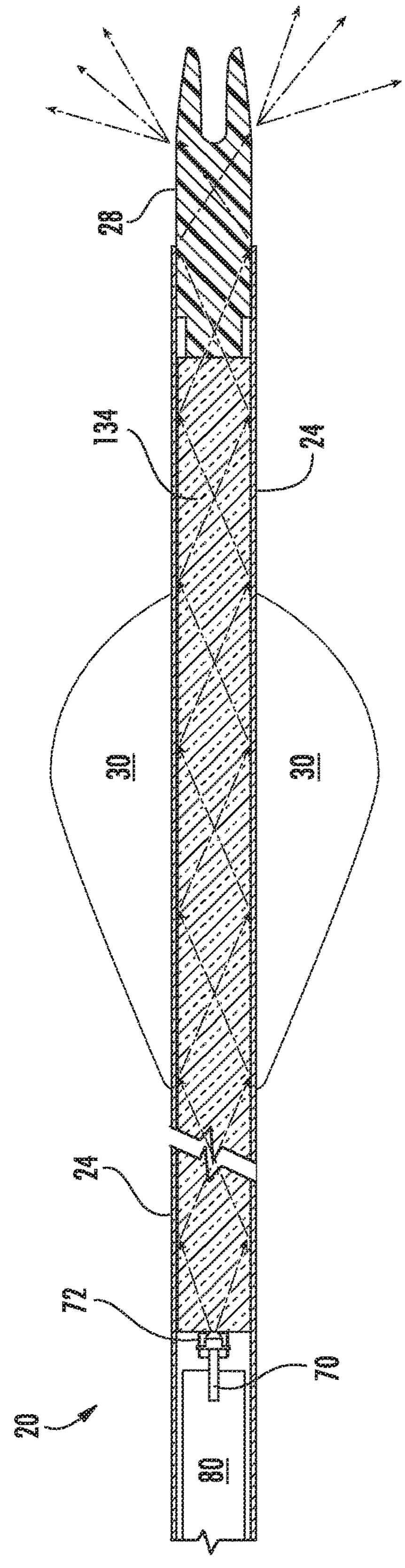
FIG. 18 is like FIG. 17, except for schematically depicting the light being transmitted through a different medium, in accordance with another example of the first embodiment.

The transmission of the light signals from the LED(s) 72 to the nock 28 may be enhanced by including a variety of different light-transmitting mediums in the pathway that extends through the interior of the composite arrow shaft 24. For example FIG. 18, depicts a transparent, clear and/or translucent, light pipe or light tube 134 (e.g., a solid, cylindrical piece of polymeric and/or glass material having a length greater than its width) that is positioned in the pathway that extends through the interior of the composite arrow shaft 24. In the example of FIG. 18, the light tube 134 has opposite ends respectively in face-to-face relation or contact with the LED(s) and nock 28.

Further regarding the above-discussed RF waves transmitted by the respective features of the arrow 20, the RF waves or signals may be described as providing telemetry information useful for at least directionally tracking the arrow. It is within the scope of this disclosure for the RF waves transmitted by the respective features of the arrow 20 to include additional telemetry information. For example, the additional telemetry information can include information about acceleration of the electronics unit 22. For example, in addition to the electronics unit's electronic components 68 including the relatively high-G accelerometer that senses the rapid acceleration of the arrow 20 that occurs when the arrow is launched from the bow as discussed above, the electronic components of the electronics unit can further include a relatively low-G accelerometer (e.g., see the one or more accelerometers 188 of FIG. 20) that is active during the Fully On State of the electronics unit 22 to measure and provide signals indicative of acceleration experienced by the electronics unit. Similarly, the high-G accelerometer can remain active during the Fully On State of the electronics unit 22 to measure and provide signals indicative of acceleration experienced by the electronics unit. As an example, the low-G and/or high-G accelerometer can be configured to sense one or more metrics of the impaled animal's physical activity and/or one or more of the impaled animal's vital signs (i.e., life-sustaining bodily functions).

When the receiver 140 is an analog receiver, the receiver and one or more of the accelerometers of the electronics unit 22 can be cooperatively configured to provide acceleration-based telemetry data to the user of the receiver 140. For example, when the arrow 20 is impaled in a wounded animal, the electronics unit 22 together with the receiver 140 can convey telemetry data about the information being sensed by respective sensor(s) 190 (e.g., see sensor(s) 190 of FIG. 90) of the electronics unit 22. The telemetry data can be indicative of at least one characteristic, for example whether the impaled animal is moving, the magnitude of that movement, whether the impaled animal's heart is beating, the orientation of the impaled animal, the body temperature of the impaled animal, and/or the like.

For example, an RF modulator of the of the electronics unit 22 can modulate the signal to the RF amplifier 69 of the electronics unit 22 so that the RF waves transmitted by the respective features of the arrow 20 include information indicative of the signals from the one or more accelerometers or other sensors of the electronics unit. The sensor-based information can be conveyed to the user listening to an audible tone on the direction-finding receiver 140 by way of changing characteristics of the RF signal and the corresponding audible tone, for example by changing the pulse rate, number of pulses, radio frequency, or modulation scheme of the radio signal, or the like. For example, the rate of the pulses can be increased to denote the impaled animal is in motion, or the rate of the pulses can be slowed down to indicate the impaled animal is stationary.

A second embodiment of this disclosure is like the first embodiment, except for variations noted and variations that will be apparent to those of ordinary skill in the art. The electronics unit 22 of the second embodiment can be configured to at least partially produce additional telemetry data and provide the telemetry data by way of the RF waves transmitted by the respective features of the arrow 20 (e.g., projectile).

Figure 19:
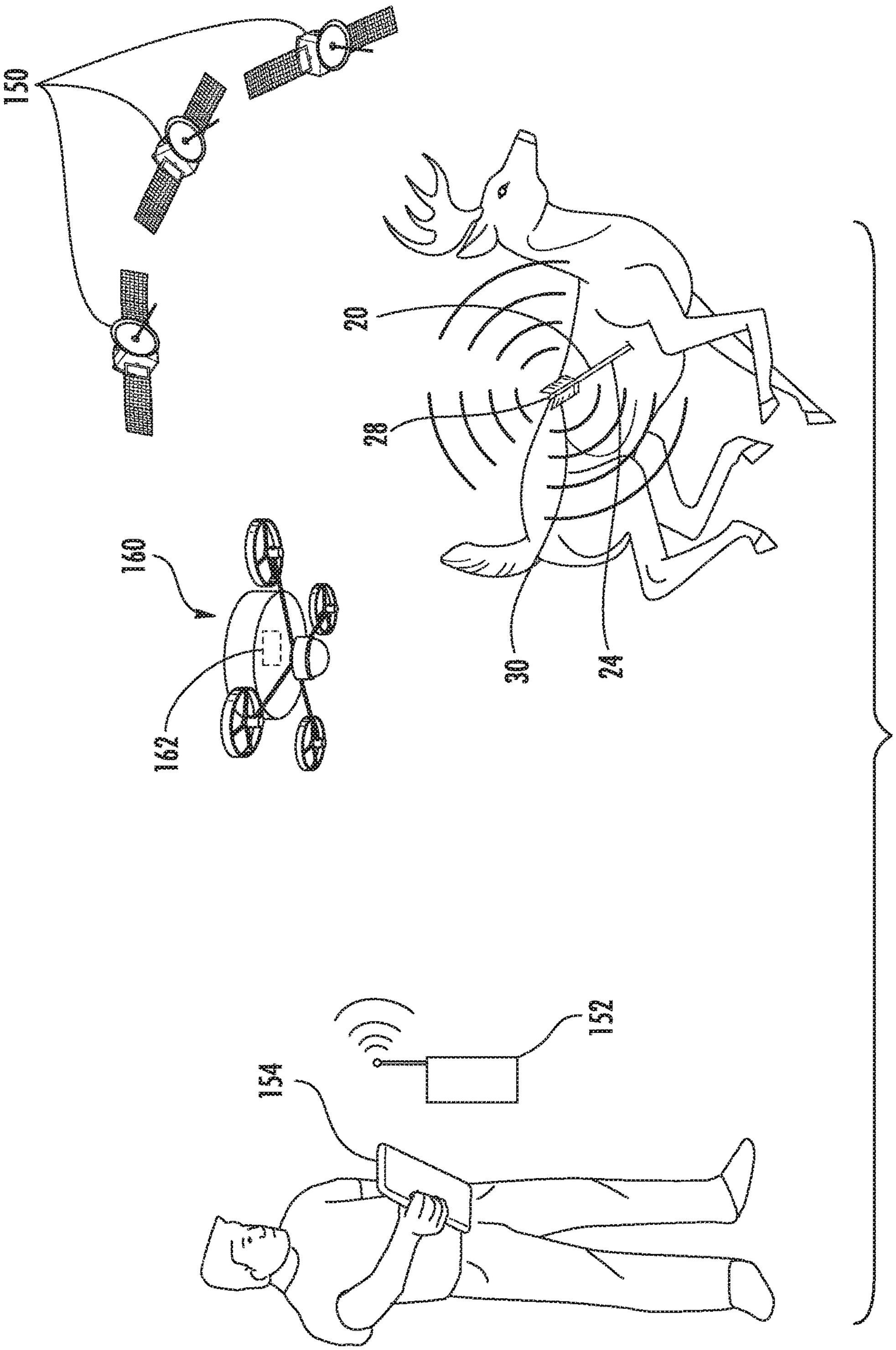
FIG. 19 depicts the arrow impaled in an animal and transmitting RF signals, and the arrow being tracked in accordance a second embodiment of this disclosure, wherein signals from navigation satellites can be used by an electronics unit of the arrow to determine and broadcast the precise location of the arrow.

Referring to FIGS. 19 and 20, the electronics unit 22 within the arrow 20 can be configured to digitally encode the telemetry data in the RF waves transmitted by the arrow, so that data can be remotely received by a digital RF receiver or digital RF transceiver 152. The digital RF receiver or digital RF transceiver 152 can include at least one computer processor (e.g., central processing unit 184), at least one computer memory (e.g., storage device), and a display screen or other suitable user interfaces for communicating the telemetry data to the user; and/or the digital RF transceiver 152 can communicate with another portable computerized device 154 (e.g., a smart phone, tablet computer or any other suitable device) having at least one computer processor (e.g., processor unit), at least one computer memory (e.g., storage device), and a display screen or other suitable user interfaces for communicating the telemetry data to the user.

As one example, the providing of telemetry data can include using at least one global navigation satellite system ("GNSS") in association with the arrow 20. For example and referring to FIG. 20, the electronics unit's electronic components 68 can further include at least one GNSS receiver module 170. The GNSS receiver module 170 can include, or be associated with, at least one filter 172 (e.g., a surface acoustic wave (SAW) filter), at least one amplifier 174 (e.g., a low noise amplifier ("LNA")) and/or any other suitable components, for example an electronic oscillator.

The GNSS receiver module 170 can be a Global Positioning System ("GPS") navigation satellite system receiver module, a GLONASS navigation satellite system receiver module, and/or a BeiDou navigation satellite system receiver module. In this regard, FIG. 19 schematically depicts satellites 150 of the GNSS system. FIG. 20 schematically depicts that the arrow 20, or more specifically the composite arrow shaft 24 and/or arrowhead 26, receives GNSS signals 176 (e.g., a 1.575 GHz GNSS signal) from the satellites 150. The electronics unit's electronic components 68 are configured to determine the GPS coordinates at which the arrow 20 is located from the GNSS signals 176 received from the satellites 150. For example, the GNSS receiver module 170 of the electronics unit's electronic components 68 can be configured to receive signals broadcast by GNSS satellites 150, the electronics unit's electronic components 68 can be configured determine location of the electronics unit 22 (and thus, the arrow 20) from the signals from the GNSS satellites 150, and the RF module 180 of the electronics unit's electronic components 68 can provide an RF signal including digital data derived from the GNSS receiver module 170 and indicative of location of the arrow (e.g., projectile). The RF module 180 of the second embodiment can more specifically be in the form of an RF transceiver module or modem 180.

Respective components depicted in FIG. 20 can be cooperatively configured to at least partially facilitate the herein-disclosed operational states, features and methods, or the like. For example, the electronic components 68 can be configured so that, when they are operating in the Fully On State within the composite arrow shaft 24, the electronics unit's GNSS receiver module 170 is electrically associated with the composite arrow shaft by way of capacitive coupling between the housing body 80 of the electronics unit 22 and the composite arrow shaft 24. In the second embodiment, the diplexer 178 and associated components of the electronic components 68 are configured so that the composite arrow shaft 24 simultaneously functions as each of a RF radiating element for the modem 180, a receiving antenna for the modem 180, and a receiving antenna for the GNSS receiver module 170. In FIG. 20, the RF signals (e.g., UHF and/or VHF signals) associated with the arrow shaft/modem 180 are designated by the numeral 182.

At least partially reiterating from above, the arrow 20 of the second embodiment includes the use of a diplexed antenna system wherein the composite arrow shaft 24 is an active element of the RF radiating antenna system, as discussed above, and the composite arrow shaft is also an active element of the GNSS receiving antenna. For example, an input of the GNSS receiver module 170 can be at least indirectly conductively electrically connected to a first port of the diplexer 178, the input and output of the modem 180 can be conductively electrically connected to at least a second port of the diplexer 178, and a third port of the diplexer 178 can be conductively electrically connected to the housing 54 of the electronics unit 22, for example by way of one or more of the conductive wire 106, solder and/or any other suitable devices. The diplexed antenna system of the second embodiment can preclude the use of a separate GNSS antenna, and allows the electronics unit 22 to receive GNSS signals and transmit the GPS coordinates and any other telemetry data to the user without the need for multiple or external antennas. Notwithstanding, variations are within the scope of this disclosure.

Also referring to FIG. 19, the arrow 20 (e.g., the arrow impaled in a wounded animal) can be tracked and videoed by an unmanned aerial vehicle ("UAV") or drone 160 that is configured to receive the RF signal transmitted from the arrow, wherein the RF signal received by the UAF includes the digital data derived from the GNSS receiver module 170 of the electronics unit's electronic components 68. In one example, the UAV 160 can be a conventional UAV (e.g., a quadcopter is depicted in FIG. 19) that is an aircraft without a human pilot aboard. The UAV can be part of an unmanned aircraft system including the UAV, a ground-based controller, and a system of communications between the UAV and the ground-based controller. For example, the portable computerized device 154 and/or RF transceiver 152 of FIG. 19 can be, or can at least partially form, the ground-based controller communicating with the UAV 160.

The UAV 160 can include at least one computer processor (e.g., central processing unit), at least one computer memory (e.g., storage device), a camera/video imaging system, and other suitable components including, for example, an antenna and an RF receiver module, and these components are collectively schematically depicted by dashed lines in FIG. 19 as a collection of electronic components 162. The UAV 160, while receiving the RF signal transmitted from the arrow 20 and tracking the arrow 20 impaled in a wounded animal, can simultaneously capture images (e.g., video) of the wounded animal, receive location information from the arrow, receive information about the wounded animal from the arrow, and transmit RF signals containing this data to the portable computerized device 154 in real time, so that a user of the portable computerized device 154 can view the images from the UAV in real time.

One or more software programs executing on the RF transceiver 152, computer device 154 and/or UAF 160 can process the information conveyed by the RF waves transmitted by the respective features of the arrow 20 to analyze and present to the user various telemetry data such as, but not limited to, movement, speed, position, elevation, bearing, video images and/or any other relevant telemetry data about an animal in which the arrow 20 is impaled. Respective relevant information can be conveyed by the RF signal transmitted by the respective features of the arrow 20 by altering the modulation of the RF signals, as will be understood by those of ordinary skill in the art.

The electronics unit 22 can be housed internally to the composite arrow shaft 24 so that the arrow's flight characteristics remain substantially unchanged as compared to a comparable arrow without an electronics unit. In the first and second embodiments, the arrow 20 has a center of mass located along a length of the composite arrow shaft 24, and the electronics unit 22 is positioned forwardly of the center of mass. The mass and forward position of the electronics unit 22 in-line with the arrowhead 26 can improve penetration of the arrowhead into the target as well as improve the stability and flight characteristics of the arrow. The electronics unit 22 can also increase the rigidity of the composite arrow shaft 24.

Reiterating from above, the first and second embodiments can be alike, except for variations noted and variations that will be apparent to those of ordinary skill in the art. For example, like in the system of the first embodiment, the system of the second embodiment can alternatively be configured so that the poise and counterpoise are interchanged, so that the arrowhead 26 functions as the poise, and the composite arrow shaft 24 functions as the counterpoise. At least partially reiterating from above, the arrowhead 26 can more generally be referred to as, or be in the form of, a tip or head.

Regarding each of the above-referenced processors, central processing units, or the like, it can be one or more pieces of computer hardware that are capable of processing information such as, for example, data, computer programs and/or other suitable electronic information. The processor can be composed of a collection of electronic circuits some of which may be packaged as an integrated circuit or multiple interconnected integrated circuits (an integrated circuit may be more commonly referred to as a "chip"). The processor may be configured to execute computer programs, which may be stored onboard the processor or otherwise stored in the memory (of the same or another apparatus). One or more computer-related devices can be included onto a single die within the central processing unit itself, for example so that a single chip can do the work of multiple computer-related devices. Whereas the above embodiments have been described primarily in the context of radio frequency communications, any other suitable frequencies, communications protocols and/or communication techniques may be used.

In the specification and/or figures, examples of embodiments have been disclosed. The present invention is not limited to such exemplary embodiments. Unless otherwise noted, specific terms have been used in a generic and descriptive sense and not for purposes of limitation. For example, the arrowhead 26 can more generally be referred to as, or be in the form of, a tip or head. The use of the term "and/or" includes any and all combinations of one or more of the associated listed items.

The invention claimed is:

1. A tracking apparatus for use in tracking a projectile selected from the group consisting of an arrow and a crossbow bolt, the tracking apparatus comprising:

an electronics unit configured to be connected to, and at least partially positioned in, a shaft of a projectile, the electronics unit comprising an electrically conductive housing defining an interior space, and a plurality of electronic components, wherein:

at least some of the electronic components are mounted in the interior space of the conductive housing, the plurality of electronic components comprises a radio frequency ("RF") module that comprises an RF amplifier and an RF ground, and output of the RF amplifier is in conductive electrical communication with the conductive housing;

an attachment assembly mounted to a front portion of the conductive housing, wherein the attachment assembly comprises an electrically conductive inner member that is in conductive electrical communication with the RF ground; and the electronics unit and the attachment assembly being cooperatively configured so that, when the electronics unit is operating and at least partially within the shaft, and a head is connected to the attachment assembly:

the RF ground is electrically associated with the head by way of at least the conductive inner member to cause the head to function as a first RF radiating element of an antenna and the head to be a counterpose of the antenna, and the RF amplifier is electrically associated with the shaft by way of at least capacitive coupling between the conductive housing and the shaft to cause the shaft to function as a second RF radiating element of the antenna and the shaft to be a poise of the antenna.

2. The tracking apparatus according to claim 1, wherein the RF module is an RF transmitter module or an RF transceiver module.

3. The tracking apparatus according to claim 1, wherein the electronics unit is configured so that, when the RF module is in the shaft and the head is connected to the end of the shaft, the head is in conductive electrical communication with the RF ground.

4. The tracking apparatus according to claim 1, wherein:

the attachment assembly further comprises an electrically non-conductive outer member extending at least partially around the electrically conductive inner member, and the electrically conductive inner member is configured to at least partially define an RF transmission path between the RF module and the head.

5. The tracking apparatus according to claim 1, wherein the electronics unit further comprises a light emitting device configured to transmit light through an interior space within the shaft in a direction from the light emitting device toward a nock at a rear end of the shaft so that the light propagates within the interior space of the shaft and illuminates the nock at the rear end of the shaft to identify an operational status of the electronics unit.

6. The tracking apparatus according to claim 1 in combination with the shaft and the head, wherein the electronics unit is at least partially positioned in the shaft and the head is connected to the end of the shaft, so that the shaft and the head at least partially form the projectile comprising the electronics unit and the attachment assembly.

7. The combination according to claim 6, wherein the shaft comprises carbon fiber.

8. The tracking apparatus according to claim 1, wherein the conductive housing is configured to function as at least part of an RF transmission path.

9. The tracking apparatus according to claim 8, wherein the electronics unit is configured so that, when the RF module is operating within the shaft, the shaft is capacitively coupled to the conductive housing to cause the shaft to function as a primary RF radiating element.

10. The tracking apparatus according to claim 1, wherein the electronics unit further comprises a global navigation satellite system ("GNSS") receiver module.

11. The tracking apparatus according to claim 10, wherein the electronics unit is configured so that, when the RF module is operating within the shaft, the GNSS receiver module is electrically associated with the head to cause the head to function as at least a portion of a receiving antenna for the GNSS receiver module.

12. The tracking apparatus according to claim 10, wherein the electronics unit is configured so that, when the RF module is operating within the shaft, the GNSS receiver module is electrically associated with the shaft to cause the shaft to function as at least a portion of a receiving antenna for the GNSS receiver module.

13. The tracking apparatus according to claim 12, wherein the electronics unit comprises a diplexer configured to cause the shaft to simultaneously function as both:

a primary RF radiating element for the RF module, and at least a portion the receiving antenna for the GNSS receiver module.

14. The tracking apparatus according to claim 10, wherein the RF module is configured to provide an RF signal, and the electronics unit is configured to have a single antenna function as both:

an antenna for transmitting the RF signal of the RF module, and a receiving antenna for the GNSS receiver module.

15. The tracking apparatus according to claim 14, wherein the tracking apparatus is configured so that the RF signal is an RF tracking signal comprising digital data derived from the GNSS receiver module and indicative of location of the tracking apparatus.

16. The tracking apparatus according to claim 1, wherein:

the electronics unit further comprises a switch configured provide a change in response to the switch being exposed to a magnetic field of predetermined magnitude; and the electronics unit is configured to operate in an operational state in response to the change of the switch.

17. The tracking apparatus according to claim 16, wherein:

the switch is a first switch;

the electronics unit further comprises a second switch configured provide a change in response to the second switch being exposed to an acceleration of predetermined magnitude while the electronics unit is operating in the operational state; and the electronics unit is configured to control operation of the RF module in response to the change provided by the second switch.

18. The tracking apparatus according to claim 1, wherein:

the electronics unit is configured to detect at least one characteristic and responsively provide at least one signal; and the electronics unit is configured to convey, in response to the at least one signal, information about the at least one characteristic by way of the RF module.

19. A tracking apparatus for use in tracking a projectile selected from the group consisting of an arrow and a crossbow bolt, the tracking apparatus comprising:

an attachment assembly configured to at least partially attach a head to a shaft of the projectile, the attachment assembly comprising a first conductive member configured to be electrically associated with the head; and an electronics unit mounted to a rear portion of the attachment assembly, the electronics unit comprising a radio frequency ("RF") module mounted in an interior space of an electrically conductive housing configured to be at least partially positioned in a shaft of the projectile, wherein a first electrically conductive pathway extends from an RF ground of the RF module to the first conductive member, wherein a second electrically conductive pathway extends from an RF amplifier of the RF module to the conductive housing, and wherein the conductive housing is configured to capacitively transfer an RF signal from the RF amplifier to the shaft when the conductive housing is at least partially positioned in the shaft.

20. The tracking apparatus according to claim 19, wherein the tracking apparatus is configured so that when the electronics unit is operatively associated with the shaft and a head connected to the shaft:

the RF ground is electrically associated with the head by way of at least the first electrically conductive pathway to cause the head to function as a first RF radiating element of an antenna and the head to be a counterpose of the antenna, and the RF amplifier is electrically associated with the shaft by way of at least the second electrically conductive pathway to cause the shaft to function as a second RF radiating element of the antenna and the shaft to be a poise of the antenna.

21. A tracking apparatus for use in tracking a projectile selected from the group consisting of an arrow and a crossbow bolt, the tracking apparatus comprising:

an electronics unit configured to be at least partially positioned in a shaft of a projectile, the electronics unit comprising a radio frequency ("RF") module mounted in an interior space of an electrically conductive housing, wherein output of an RF amplifier of the of the RF module is in conductive electrical communication with the conductive housing, and the conductive housing is configured to capacitively transfer an RF signal from the RF amplifier to the shaft and cause the shaft to function as a poise of an antenna when the conductive housing is at least partially positioned in the shaft; and an attachment assembly configured to at least partially attach both the electronics unit and a head to the shaft, wherein a rearward portion of the attachment assembly is connected to a forward portion of the electronics unit, the attachment assembly is configured to be at least partially positioned in the shaft of the projectile with the electronics unit, the attachment assembly comprises a forwardly open receptacle configured to releasably receive and retain a shank of the head, a forward portion of an outer member of the attachment assembly is configured to expand, in response to the receptacle releasably receiving and retaining the shank, to cause the attachment assembly and the electronics unit to be releasably retained in the shaft, and the attachment assembly comprises an electrically conductive inner member that is in conductive electrical communication with an RF ground of the RF module, wherein the conductive inner member is configured to be in conductive electrical communication with the head and cause the head to function as a counterpoise of the antenna when the head is attached to the shaft by way of at least the attachment assembly.

22. The tracking apparatus according to claim 21, wherein:

the outer member of the attachment assembly extends at least partially around the conductive inner member of the attachment assembly; and the conductive inner member of the attachment assembly comprises an internal screw thread configured to mate with a screw thread of the shank.

23. The tracking apparatus according to claim 21, wherein the outer member of the attachment assembly is electrically non-conductive and extends at least partially around the conductive inner member of the attachment assembly.

24. A tracking apparatus for use in tracking a projectile selected from the group consisting of an arrow and a crossbow bolt, the tracking apparatus comprising:

an electronics unit configured to be connected to a shaft of a projectile, the electronics unit comprising both a radio frequency ("RF") module and a global navigation satellite system ("GNSS") receiver module, and the electronics unit being configured so that, when the electronics unit is operatively associated with the shaft and a head connected to an end of the shaft:

the RF module is electrically associated with the head to cause the head to function as a first RF radiating element, and the RF module is electrically associated with the shaft to cause the shaft to function as a second RF radiating element, wherein the electronics unit is configured so that, when the RF module is operating within the shaft, the GNSS receiver module is electrically associated with the head to cause the head to function as at least a portion of a receiving antenna for the GNSS receiver module.

25. The tracking apparatus according to claim 24, wherein the electronics unit is configured so that, when the RF module is operating within the shaft, the GNSS receiver module is electrically associated with the shaft to cause the shaft to function as at least a portion of a receiving antenna for the GNSS receiver module.

26. The tracking apparatus according to claim 25, wherein the electronics unit comprises a diplexer configured to cause the shaft to simultaneously function as both:

a primary RF radiating element for the RF module, and at least a portion the receiving antenna for the GNSS receiver module.

27. The tracking apparatus according to claim 24, wherein RF module is configured to provide an RF signal, and the electronics unit is configured to have a single antenna function as both:

an antenna for transmitting the RF signal of the RF module, and a receiving antenna for the GNSS receiver module.

28. The tracking apparatus according to claim 27, wherein the tracking apparatus is configured so that the RF signal is an RF tracking signal comprising digital data derived from the GNSS receiver module and indicative of location of the tracking apparatus.

29. A tracking apparatus for use in tracking a projectile selected from the group consisting of an arrow and a crossbow bolt, the tracking apparatus comprising:

an electronics unit configured to be positioned in a shaft of a projectile, wherein the electronics unit comprises a plurality of electronic components mounted on at least one circuit board positioned in an interior space of an electrically conductive housing, the plurality of electronic components comprises a radio frequency ("RF") module that comprises an RF amplifier and an RF ground, output of the RF amplifier is in conductive electrical communication with the conductive housing, and the conductive housing is configured to capacitively couple with the shaft and cause the shaft to function as a poise of an antenna when the electronics unit is positioned in the shaft; and an attachment assembly mounted to a front portion of the conductive housing, wherein the attachment assembly is configured to at least partially attach a head to the shaft while the attachment assembly is at least partially positioned in the shaft with the electronics unit, the attachment assembly comprises an electrically non-conductive outer member extending at least partially around an electrically conductive inner member, the conductive inner member is in conductive electrical communication with the RF ground, and the conductive inner member is configured to be in conductive electrical communication with the head and cause the head to function as a counterpoise of the antenna when the head is attached to the shaft by way of at least the attachment assembly.

30. The tracking apparatus according to claim 29, wherein the conductive inner member comprises an internal screw thread configured to mate with a screw thread of a shank of the head.

31. The tracking apparatus according to claim 29, wherein:

the electronics unit comprises a battery positioned in the interior space of the conductive housing; and the battery is positioned between the circuit board and the attachment assembly.

32. The tracking apparatus according to claim 31, wherein the circuit board is a rearward circuit board, and the electronics unit further comprises:

a forward circuit board positioned between the battery and the conductive inner member, wherein the battery is positioned between the rearward and forward circuit boards, and the conductive inner member is in conductive electrical communication with the forward circuit board; and wires connecting the rearward and forward circuit boards to one another.

33. The tracking apparatus according to claim 32, wherein:

the electronics unit further comprises battery-recharging circuitry mounted to the rearward circuit board, and a pin terminal positioned in an interior space of the conductive inner member of the attachment assembly; and the pin terminal is in conductive electrical communication with the battery-recharging circuitry by way of at least the forward circuit board and a wire of the wires connecting the rearward and forward circuit boards to one another.

34. The tracking apparatus according to claim 29 in combination with the shaft and the head, wherein the electronics unit is at least partially positioned in the shaft and the head is connected to the end of the shaft, so that the shaft and the head at least partially form the projectile comprising the electronics unit and the attachment assembly.

35. The combination according to claim 34, wherein the shaft comprises carbon fiber.

36. The combination according to claim 34, wherein there is face-to-face contact between a collar of the head and a flange of the non-conductive outer member of the attachment assembly; and an effective feed point of the antenna is located at the face-to-face contact between the collar of the head and the flange of the non-conductive outer member of the attachment assembly.

* * * * *